US012706989B2

(12) United States Patent
Xu

(10) Patent No.: US 12,706,989 B2
(45) Date of Patent: Aug. 11, 2026

(54) COMMUNICATION PROTOCOL CONVERSION METHOD, AND DEVICE, SYSTEM, AND GATEWAY DEVICE

(71) Applicant: BOE Technology Group Co., Ltd., Beijing (CN)

(72) Inventor: Qi Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 309 days.

(21) Appl. No.: 18/576,634

(22) PCT Filed: Jul. 27, 2022

(86) PCT No.: PCT/CN2022/108151
§ 371 (c)(1),
(2) Date: Jan. 4, 2024

(87) PCT Pub. No.: WO2023/011274
PCT Pub. Date: Feb. 9, 2023

(65) Prior Publication Data

US 2024/0214472 A1 Jun. 27, 2024

(30) Foreign Application Priority Data

Aug. 4, 2021 (CN) ......................... 202110893155.2

(51) Int. Cl.
*H04L 69/08* (2022.01)
*H04L 65/1069* (2022.01)
*H04L 67/00* (2022.01)

(52) U.S. Cl.
CPC .......... *H04L 69/08* (2013.01); *H04L 65/1069* (2013.01); *H04L 67/34* (2013.01)

(58) Field of Classification Search
CPC ..... H04L 69/08; H04L 65/1069; H04L 67/34; H04L 63/0807; H04L 63/0884;
(Continued)

(56) References Cited

U.S. PATENT DOCUMENTS

2013/0326045 A1* 12/2013 Wang .................. H04L 41/0226 709/223
2016/0191415 A1 6/2016 Reddy et al.
(Continued)

FOREIGN PATENT DOCUMENTS

CN 101931584 A 12/2010
CN 105141601 A 12/2015
(Continued)

OTHER PUBLICATIONS

Chinese First Office Action, mailed Oct. 10, 2022, from Chinese Application No. 202110893155.2, 14 pages.
(Continued)

*Primary Examiner* — Kyaw Z Soe
(74) *Attorney, Agent, or Firm* — Workman Nydegger

(57) ABSTRACT

The present disclosure discloses a communication protocol conversion method, a device, a system, and a gateway device, which are used to provide a general communication protocol conversion method. The method includes: receiving at least one network request message sent by a communication device for establishing a communication connection with a third-party system; determining, from within a configuration rule set, a configuration rule corresponding to the network request message, where the configuration rule set comprises configuration rules for communication protocols of different third-party systems; performing communication protocol conversion on the network request message according to the configuration rule; and sending the network request message after the communication protocol conversion to a corresponding third-party system.

19 Claims, 25 Drawing Sheets

(58) Field of Classification Search
CPC . H04L 63/0428; H04L 63/102; H04L 63/126; H04L 65/1033; H04L 67/02; H04L 67/565; H04W 4/70
See application file for complete search history.

(56) References Cited

U.S. PATENT DOCUMENTS

| | | | | |
|---|---|---|---|---|
| 2019/0028572 | A1* | 1/2019 | Chen | H04L 41/0816 |
| 2021/0021695 | A1 | 1/2021 | Burke | |

FOREIGN PATENT DOCUMENTS

| | | | |
|---|---|---|---|
| CN | 105516185 | A | 4/2016 |
| CN | 106899461 | A | 6/2017 |
| CN | 110971614 | A | 4/2020 |
| CN | 111163147 | A | 5/2020 |
| CN | 112202816 | A | 1/2021 |
| CN | 112511415 | A | 3/2021 |
| CN | 112511416 | A | 3/2021 |
| CN | 111193695 | B | 7/2021 |
| CN | 113206836 | A | 8/2021 |

OTHER PUBLICATIONS

International Search Report, mailed Oct. 12, 2022, from PCT/CN2022/108151, 4 pages.

Extended European Search Report, mailed Apr. 2, 2024, from European Application No. 22851988.0, 9 pages.

* cited by examiner

Home page
Gateway management
Route management
Configuration rule
Gateway log Home page/Gateway management/Route management Search | Reset | Add

| Route name | Route description | Path | Complete address | Service ID | Attribution application | Configuration rule ID | Whether to retry | Operation |
|---|---|---|---|---|---|---|---|---|
| bdteam | Device, Trajectory, Hotel | /bdteam/** | Https://47.92.159.140.11447 | | Big data application | None | Do not retry | Edit Delete More operations |
| Sky eye | Sky eye | /tianyancha/** | | | Sky eye | Sky eye | Do not retry | Edit Delete **More operations** |
| Log service | Log service | /log/** | | Log | megarock | None | Do not retry | Edit Delete More operations |
| Safety Management | Safety Management | /security/** | | security | Safety Management | None | Retry | Edit Delete More operations |

Fig. 3C

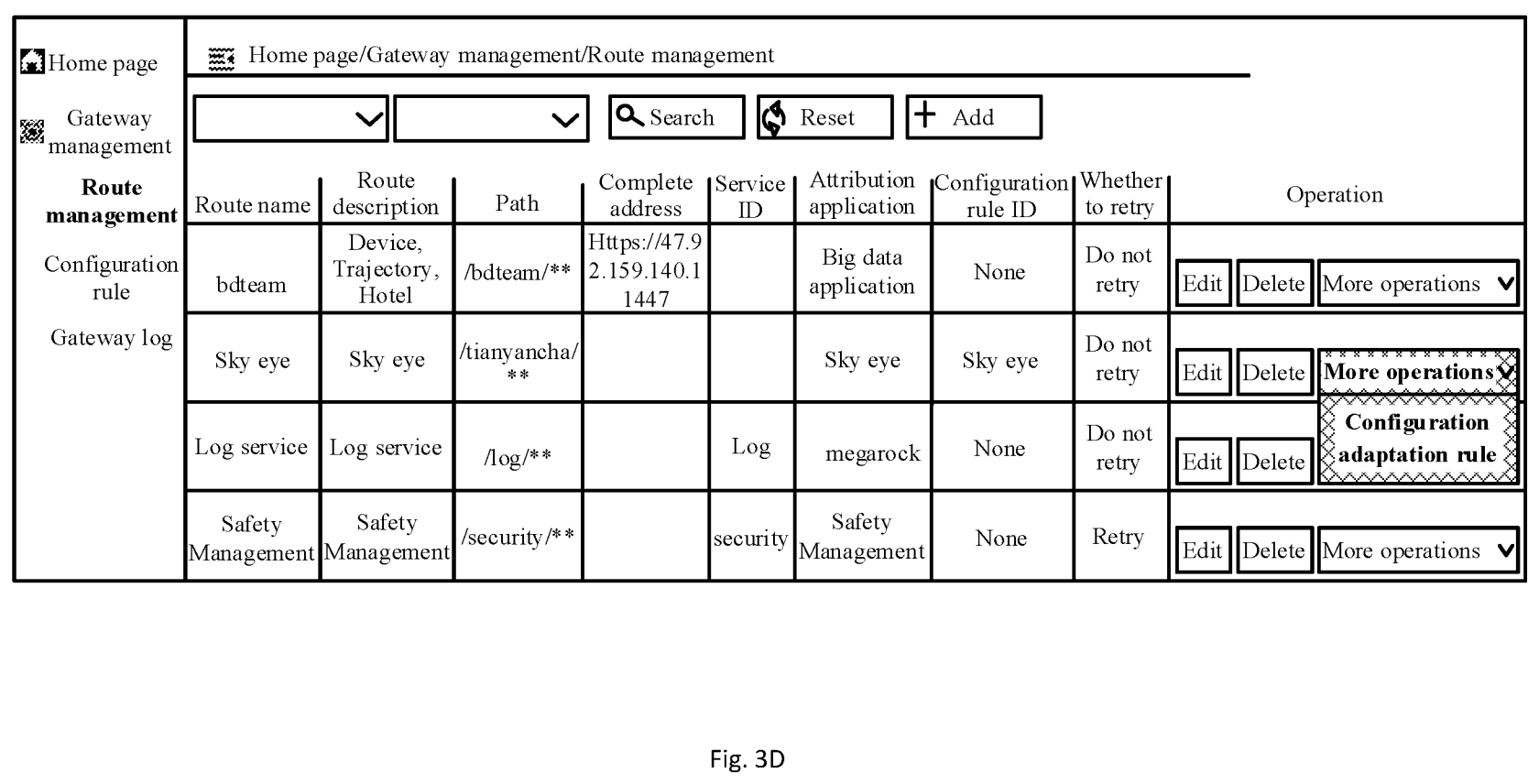

Home page

Gateway management

Route management

Configuration rule

Gateway log

Home page/Gateway management/Route management

Search | Reset | Add

| Route name | Route description | Path | Complete address | Service ID | Attribution application | Configuration rule ID | Whether to retry | Operation |
|---|---|---|---|---|---|---|---|---|
| bdteam | Device, Trajectory, Hotel | /bdteam/** | Https://47.92.159.140.11447 | | Big data application | None | Do not retry | Edit Delete More operations |
| Sky eye | Sky eye | /tianyancha/** | | | Sky eye | Sky eye | Do not retry | Edit Delete **More operations** |
| Log service | Log service | /log/** | | Log | megarock | None | Do not retry | Edit Delete **Configuration adaptation rule** |
| Safety Management | Safety Management | /security/** | | security | Safety Management | None | Retry | Edit Delete More operations |

Fig. 3D

| Ethernet header | IP header | TCP header | Application layer data |
|---|---|---|---|

Fig. 4A

| TCP/IP model | Application layer protocol | HTTP、SMTP、FTP |
|---|---|---|
| | TCP/IP protocol | Transport layer protocol (TCP protocol) |
| | | Network layer protocol (IP protocol) |
| | Link layer (e.g., Ethernet) | Physical layer protocol |

Fig. 4B

Home page
Gateway management
Route management
Configuration rule
Gateway log Home page/Gateway management/Route management Search Reset + Add

| Route name | Path | Complete address | Service ID | Configuration rule | Attribution application | Ignore prefix |
|---|---|---|---|---|---|---|
| Jintiane | /jintiane/** | Https://g/kesiyunlai/com | | Rule A | | |
| Video cloud | /vc/** | | | Rule B | | |
| Digital twin | /dt/** | | | Rule C | | |
| Visual serving | /datav/** | | | Rule D | | |

Fig. 5

Home page

Gateway management

Route management

Configuration rule

Gateway log

Home page/Gateway management/Route management

Search | Reset | + Add

| Route name | Path | Complete address | Service ID | Configuration rule | Operation |
|---|---|---|---|---|---|
| Jintiane | /jintiane/** | Https://g/kesiyunlai/com | | Rule A | Edit Delete More operations |
| Video cloud | /vc/** | | | Rule B | Edit Delete More operations |
| Digital twin | /dt/** | | | Rule C | Edit Delete More operations |
| Visual serving | /datav/** | | | Rule D | Edit Delete More operations |

Fig. 11A

Figure 11B:
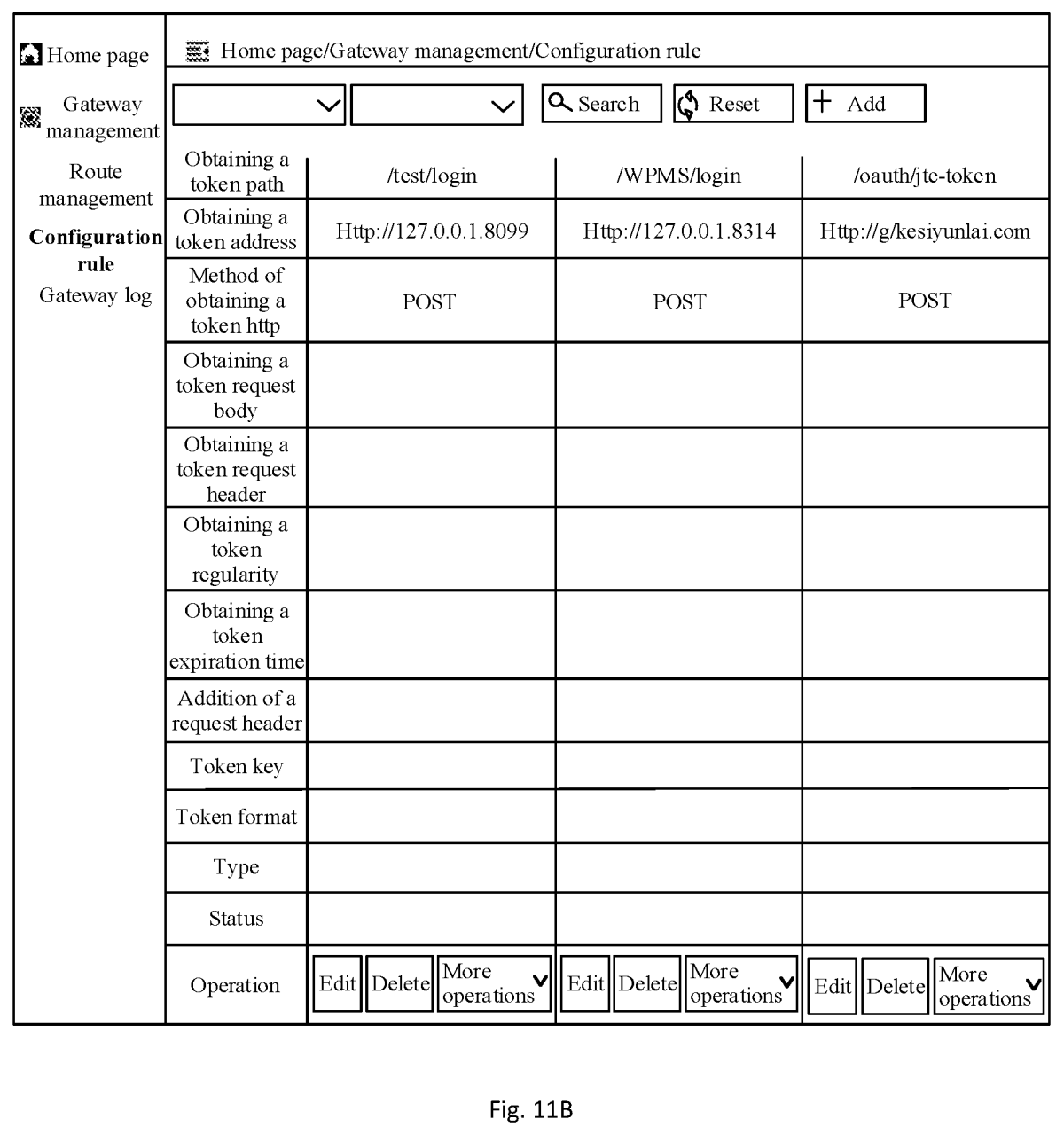

| Obtaining a token path | /test/login | /WPMS/login | /oauth/jte-token |
|---|---|---|---|
| Obtaining a token address | Http://127.0.0.1.8099 | Http://127.0.0.1.8314 | Http://g/kesiyunlai.com |
| Method of obtaining a token http | POST | POST | POST |
| Obtaining a token request body | | | |
| Obtaining a token request header | | | |
| Obtaining a token regularity | | | |
| Obtaining a token expiration time | | | |
| Addition of a request header | | | |
| Token key | | | |
| Token format | | | |
| Type | | | |
| Status | | | |
| Operation | Edit Delete More operations | Edit Delete More operations | Edit Delete More operations |

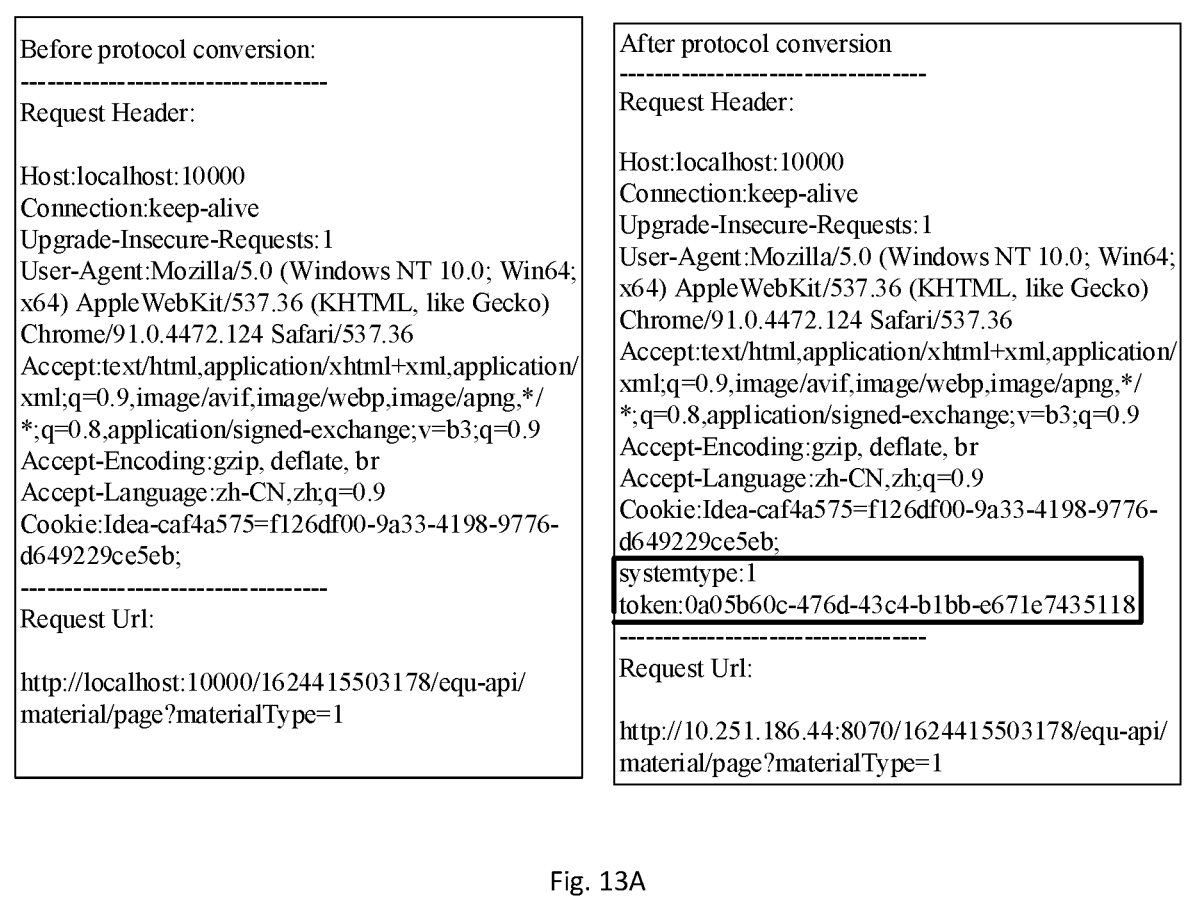

Before protocol conversion:
-----------------------------------
Request Header:

Host:localhost:10000
Connection:keep-alive
Upgrade-Insecure-Requests:1
User-Agent:Mozilla/5.0 (Windows NT 10.0; Win64; x64) AppleWebKit/537.36 (KHTML, like Gecko) Chrome/91.0.4472.124 Safari/537.36
Accept:text/html,application/xhtml+xml,application/xml;q=0.9,image/avif,image/webp,image/apng,*/*;q=0.8,application/signed-exchange;v=b3;q=0.9
Accept-Encoding:gzip, deflate, br
Accept-Language:zh-CN,zh;q=0.9
Cookie:Idea-caf4a575=f126df00-9a33-4198-9776-d649229ce5eb;
-----------------------------------
Request Url:

http://localhost:10000/1624415503178/equ-api/material/page?materialType=1

After protocol conversion
-----------------------------------
Request Header:

Host:localhost:10000
Connection:keep-alive
Upgrade-Insecure-Requests:1
User-Agent:Mozilla/5.0 (Windows NT 10.0; Win64; x64) AppleWebKit/537.36 (KHTML, like Gecko) Chrome/91.0.4472.124 Safari/537.36
Accept:text/html,application/xhtml+xml,application/xml;q=0.9,image/avif,image/webp,image/apng,*/*;q=0.8,application/signed-exchange;v=b3;q=0.9
Accept-Encoding:gzip, deflate, br
Accept-Language:zh-CN,zh;q=0.9
Cookie:Idea-caf4a575=f126df00-9a33-4198-9776-d649229ce5eb;
systemtype:1
token:0a05b60c-476d-43c4-b1bb-e671e7435118
-----------------------------------
Request Url:

http://10.251.186.44:8070/1624415503178/equ-api/material/page?materialType=1

Fig. 13A

Before protocol conversion:
----------------------------------
Request Header:

Host:localhost:10000
Connection:keep-alive
Upgrade-Insecure-Requests:1
User-Agent:Mozilla/5.0 (Windows NT 10.0; Win64; x64) AppleWebKit/537.36 (KHTML, like Gecko) Chrome/91.0.4472.124 Safari/537.36
Accept:text/html,application/xhtml+xml,application/xml;q=0.9,image/avif,image/webp,image/apng,*/*;q=0.8,application/signed-exchange;v=b3;q=0.9
Accept-Encoding:gzip, deflate, br
Accept-Language:zh-CN,zh;q=0.9
Cookie:Idea-caf4a575=f126df00-9a33-4198-9776-d649229ce5eb;
----------------------------------
Request Url:

http://localhost:10000/1624415503178/equ-api/material/page?materialType=1
----------------------------------
Request Body:

{"groupId":123456,"eventList":[{"areaCode":100021,"triggerType":"enter"}]}

After protocol conversion
----------------------------------
Request Header:

Host:localhost:10000
Connection:keep-alive
Upgrade-Insecure-Requests:1
User-Agent:Mozilla/5.0 (Windows NT 10.0; Win64; x64) AppleWebKit/537.36 (KHTML, like Gecko) Chrome/91.0.4472.124 Safari/537.36
Accept:text/html,application/xhtml+xml,application/xml;q=0.9,image/avif,image/webp,image/apng,*/*;q=0.8,application/signed-exchange;v=b3;q=0.9
Accept-Encoding:gzip, deflate, br
Accept-Language:zh-CN,zh;q=0.9
Cookie:Idea-caf4a575=f126df00-9a33-4198-9776-d649229ce5eb;

----------------------------------
Request Url:

http://10.251.186.44:8070/1624415503178/equ-api/material/page?materialType=1
----------------------------------
Request Body:

eyJncm91cElkIjoxMjM0NTYsImV2ZW50TGlzdCI6W3siYXJlYUNvZGUiOjEwMDAyMSwidHJpZ2dlclR5cGUiOiJlbnRlciJ9XX0=

Fig. 13B

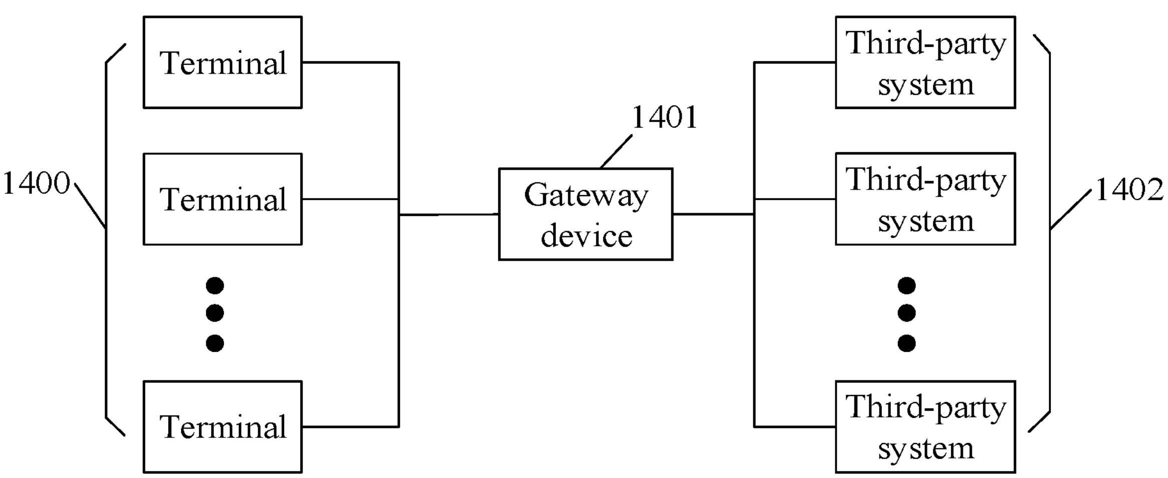

Fig. 14

COMMUNICATION PROTOCOL CONVERSION METHOD, AND DEVICE, SYSTEM, AND GATEWAY DEVICE

CROSS REFERENCE TO RELATED APPLICATION

The present disclosure is a National Stage of International Application No. PCT/CN2022/108151, filed on Jul. 27, 2022, which claims the priority of Chinese patent application No. 202110893155.2, filed with the Chinese Patent Office on Aug. 4, 2021 and entitled "Communication Protocol Conversion Method, and Device, System, and Gateway Device". The entire contents of which are incorporated herein by reference.

TECHNICAL FIELD

The present disclosure relates to the field of cloud services, and in particular to a communication protocol conversion method, device, system and gateway device.

BACKGROUND

With the development of cloud services, the Internet of Things or Internet manufacturers have developed cloud service systems for their own products. In the actual production process, products, systems and services from multiple third parties are needed to build their own schemes. For example, products, such as monitoring systems and management systems, etc., from different manufacturers are used to build a smart cloud city. Since the products from different manufacturers have different communication protocols, different authentication manners, and independent databases, how to combine cloud service systems from different manufacturers on an Internet of Things cloud platform to establish communications between products from multiple manufacturers is a problem that needs to be solved urgently.

SUMMARY

The present disclosure provides a communication protocol conversion method, device, system and gateway device, which provides a general communication protocol conversion method.

In a first aspect, an embodiment of the present disclosure provides a communication protocol conversion method. The method includes: receiving at least one network request message sent by a communication device, where the network request message represents a message for establishing a communication connection with a third-party system; determining a configuration rule corresponding to the network request message from a set of configuration rules, where the set of configuration rules includes configuration rules of communication protocols of different third-party systems; performing communication protocol conversion on the network request message according to the configuration rule; and sending the network request message after the communication protocol conversion to a corresponding third-party system.

As an optional embodiment, the method further includes: receiving at least one network request message for establishing a communication connection with a non-third-party system sent by the communication device; and directly sending the network request message to the non-third-party system.

As an optional embodiment, the method further includes: receiving a network request message sent by the communication device, determining that the network request message is a network request message for establishing a communication connection with a third-party system, or determining that the network request message is a network request message for establishing a communication connection with a non-third-party system.

As an optional embodiment, the determining the configuration rule corresponding to the network request message from the set of configuration rules, includes: determining the configuration rule corresponding to route information from the set of configuration rules according to the route information carried in the network request message.

As an optional embodiment, the configuration rule is in a one-to-one correspondence with the route information; or, multiple pieces of route information correspond to the same configuration rule.

As an optional embodiment, the determining the configuration rule corresponding to the route information from the set of configuration rules according to the route information carried in the network request message, includes: determining a third-party system corresponding to the route information according to the route information carried in the network request message; and determining the configuration rule corresponding to the third-party system from the set of configuration rules.

As an optional embodiment, the performing communication protocol conversion on the network request message according to the configuration rule, includes: obtaining a process of protocol conversion by instantiating protocol conversion rules in the configuration rule; and performing communication protocol conversion on the network request message through the process of protocol conversion.

As an optional embodiment, the instantiating the protocol conversion rules in the configuration rule, includes: in a case that the configuration rule includes a software development kit file of the third-party system, loading the software development kit file of the third-party system via a class loader to obtain a process of executing the software development kit file, where the software development kit file is in a one-to-one correspondence with the third-party system.

As an optional embodiment, the performing communication protocol conversion on the network request message through the process of protocol conversion, including: performing digital signature and encryption on the network request message by the process of executing the software development kit file.

In the embodiment, external sdk files can also be loaded. The method in the embodiment can also be applied to third-party systems that do not disclose their own data encryption and signature algorithms, data encryption and signature can be performed on the network request message by loading the external sdk files.

As an optional embodiment, the sending the network request message after the communication protocol conversion to the corresponding third-party system, includes: sending the network request message after the communication protocol conversion to the third-party system corresponding to the route information according to the route information carried in the network request message.

As an optional embodiment, after sending the network request message after the communication protocol conversion to the corresponding third-party system, the method further includes: receiving a network response message from the third-party system, and determining a configuration rule of the third-party system from the set of configuration rules;

performing communication protocol conversion on the network response message according to the configuration rule; and sending the network response message after the communication protocol conversion to the communication device.

As an optional embodiment, the performing communication protocol conversion on the network response message according to the configuration rule, includes: obtaining a process of protocol conversion by instantiating protocol conversion rules in the configuration rule; and performing communication protocol conversion on the network response message via the process of protocol conversion.

As an optional embodiment, the sending the network response message after the communication protocol conversion to the communication device, includes: sending the network response message after the communication protocol conversion to the communication device at a source address according to the source address in the network request message.

As an optional embodiment, after receiving the network request message for establishing a communication connection with the third-party system sent by the communication device, the method further includes: determining access token information in the configuration rule corresponding to the network request message; and periodically sending a connection request message for maintaining a session connection to the third-party system according to the access token information.

As an optional embodiment, after the periodically sending the connection request message for maintaining a session connection to the third-party system, the method further includes: receiving the access token from the third-party system, accessing a probing interface of the third-party system according to a preset period, and determining the validity of the access token.

As an optional embodiment, after determining the validity of the access token, the method further includes: in a case that the access token is invalid, prompting the user through a display interface that the access token of the third-party system is invalid.

As an optional embodiment, after determining the validity of the access token, the method further includes: in a case that the access token is invalid, reacquiring a valid access token of the third-party system, and updating the access token of the third-party system in the configuration rule by using the valid access token.

As an optional embodiment, the reacquiring the valid access token of the third-party system, includes: resending a connection request message for maintaining a session connection to the third-party system according to the access token information in the configuration rule corresponding to the network request message; and receiving a valid access token from the third-party system.

As an optional embodiment, the method further includes: receiving at least one instruction of deleting, modifying, or adding a configuration rule from the user through the display interface.

As an optional embodiment, the method further includes: receiving at least one instruction of the user performing a touch operation or a voice control operation on the configuration rule on the display interface, and triggering the execution of an operation corresponding to the instruction on the configuration rule; or, receiving at least one instruction of the user performing a touch operation or a voice control operation on the configuration rule in a pop-up window on the display interface, and triggering the execution of an operation corresponding to the instruction on the configuration rule.

As an optional embodiment, after receiving at least one instruction of deleting, modifying, or adding a configuration rule from the user through the display interface, the method further includes: receiving a database synchronization instruction triggered by the user through the display interface, and updating the set of configuration rules; or, updating the set of configuration rules according to a preset period.

As an optional embodiment, the updating the set of configuration rules, includes: in a case that a change of a configuration rule in the set of configuration rules is monitored through a monitoring process, notifying an update process to update the set of configuration rules; or, storing the set of configuration rules in a message queue and monitoring content of the message queue, and updating the content of the message queue in a case that a change of a configuration rule in the set of configuration rules is monitored.

As an optional embodiment, the updating the set of configuration rules, includes: in a case that a new configuration rule exists, updating the set of configuration rules according to the new configuration rule; or, in a case that a configuration rule in the set of configuration rules is deleted, updating the set of configuration rules according to the deleted configuration rule; or, in a case that a configuration rule in the set of configuration rules is modified, updating the set of configuration rules according to the modified configuration rule.

As an optional embodiment, the configuration rules include at least one of a routing rule, an encoding and decoding rule or a protocol conversion rule. The protocol conversion rules include at least one of a token configuration rule, a digital signature configuration rule, a message configuration rule, or a configuration rule using a software development kit file.

In a second aspect, an embodiment of the present disclosure provides a system for communication protocol conversion. The system includes: a communication device, a gateway device, and multiple third-party systems. The communication device is configured to send a network request message for establishing a communication connection with the third-party system. The gateway device is configured to receive the network request message, determine a configuration rule corresponding to the network request message from the set of configuration rules, perform communication protocol conversion on the network request message according to the configuration rule, and send the network request message after the communication protocol conversion to the corresponding third-party system. The set of configuration rules includes configuration rules of communication protocols of different third-party systems.

In a third aspect, an embodiment of the present disclosure provides a gateway device. The gateway device includes a processor and a memory. The memory is configured to store executable programs of the processor. The processor is configured to read the programs in the memory to execute: receiving at least one network request message for establishing a communication connection with a third-party system sent by a communication device; determining a configuration rule corresponding to the network request message from a set of configuration rules, where the set of configuration rules includes configuration rules of communication protocols of different third-party systems; performing communication protocol conversion on the network request message according to the configuration rule; and sending the network request message after the communication protocol conversion to the corresponding third-party system.

As an optional embodiment, the processor is further configured to execute: receiving at least one network request message for establishing a communication connection with a non-third-party system sent by the communication device; and directly sending the network request message to the non-third-party system.

As an optional embodiment, the processor is further configured to execute: receiving a network request message from the communication device, determining that the network request message is a network request message for establishing a communication connection with a third-party system, or determining that the network request message is a network request message for establishing a communication connection with a non-third-party system.

As an optional embodiment, the processor is configured to execute: determining a configuration rule corresponding to route information from the set of configuration rules according to the route information carried in the network request message.

As an optional embodiment, the configuration rule is in a one-to-one correspondence with the route information; or, the multiple pieces of route information correspond to the same configuration rule.

As an optional embodiment, the processor is configured to execute: determining a third-party system corresponding to the route information according to the route information carried in the network request message; and determining a configuration rule corresponding to the third-party system from the set of configuration rules.

As an optional embodiment, the processor is configured to execute: obtaining a process of protocol conversion by instantiating protocol conversion rules in the configuration rule; and performing communication protocol conversion on the network request message through the process of protocol conversion.

As an optional embodiment, the processor is configured to execute: in a case that the configuration rule includes a software development kit file of the third-party system, loading the software development kit file of the third-party system via a class loader to obtain a process of executing the software development kit file, where the software development kit file is in a one-to-one correspondence with the third-party system.

As an optional embodiment, the processor is configured to execute: performing digital signature and encryption on the network request message by the process of executing the software development kit file.

As an optional embodiment, the processor is configured to execute: sending the network request message after the communication protocol conversion to the third-party system corresponding to the route information according to the route information carried in the network request message.

As an optional embodiment, after sending the network request message after the communication protocol conversion to the corresponding third-party system, the processor is further configured to execute: receiving a network response message from the third-party system, and determining the configuration rule of the third-party system from the set of configuration rules; performing communication protocol conversion on the network response message according to the configuration rule; and sending the network response message after the communication protocol conversion to the communication device.

As an optional embodiment, the processor is configured to execute: obtaining a process of protocol conversion by instantiating protocol conversion rules in the configuration rule; and performing communication protocol conversion on the network response message via the process of protocol conversion.

As an optional embodiment, the processor is configured to execute: sending the network response message after the communication protocol conversion to the communication device at a source address according to the source address in the network request message.

As an optional embodiment, after receiving the network request message for establishing a communication connection with the third-party system sent by the communication device, the processor is further configured to execute: determining access token information in the configuration rule corresponding to the network request message; and periodically sending a connection request message for maintaining a session connection to the third-party system according to the access token information.

As an optional embodiment, after the periodically sending the connection request message for maintaining a session connection to the third-party system, the processor is further configured to execute: receiving the access token from the third-party system, accessing a probing interface of the third-party system according to a preset period, and determining the validity of the access token.

As an optional embodiment, after determining the validity of the access token, the processor is further configured to execute: in a case that the access token is invalid, prompting the user through a display interface that the access token of the third-party system is invalid.

As an optional embodiment, after determining the validity of the access token, the processor is further configured to execute: in a case that the access token is invalid, reacquiring a valid access token of the third-party system, and updating the access token of the third-party system in the configuration rule by using the valid access token.

As an optional embodiment, the processor is configured to execute: resending a connection request message for maintaining a session connection to the third-party system according to the access token information in the configuration rule corresponding to the network request message; and receiving a valid access token from the third-party system.

As an optional embodiment, the processor is further configured to execute: receiving at least one instruction of deleting, modifying, or adding a configuration rule from the user through the display interface.

As an optional embodiment, the processor is further configured to execute: receiving at least one instruction of the user performing a touch operation or a voice control operation on the configuration rule on the display interface, and triggering the execution of an operation corresponding to the instruction on the configuration rule; or, receiving at least one instruction of the user performing a touch operation or a voice control operation on the configuration rule in a pop-up window on the display interface, and triggering the execution of an operation corresponding to the instruction on the configuration rule.

As an optional embodiment, after receiving at least one instruction of deleting, modifying, or adding a configuration rule from the user through the display interface, the processor is further configured to execute: receiving a database synchronization instruction triggered by the user through the display interface, and updating the set of configuration rules; or, updating the set of configuration rules according to a preset period.

As an optional embodiment, the processor is configured to execute: in a case that a change of a configuration rule in the set of configuration rules is monitored through a monitoring process, notifying an update process to update the set of configuration rules; or, storing the set of configuration rules in a message queue and monitoring content of the message queue, and updating the content of the message queue in a case that a change of a configuration rule in the set of configuration rules is monitored.

As an optional embodiment, the processor is configured to execute: in a case that a new configuration rule exists, updating the set of configuration rules according to the new configuration rule; or, in a case that a configuration rule in the set of configuration rules is deleted, updating the set of configuration rules according to the deleted configuration rule; or, in a case that a configuration rule in the set of configuration rules is modified, updating the set of configuration rules according to the modified configuration rule.

As an optional embodiment, the configuration rules include at least one of a routing rule, an encoding and decoding rule, or a protocol conversion rule. The protocol conversion rules include at least one of a token configuration rule, a digital signature configuration rule, a message configuration rule, or a configuration rule using a software development kit file.

In a fourth aspect, an embodiment of the present disclosure further provides a communication protocol conversion device. The device includes a processor and a memory. The memory is configured to store executable programs of the processor. The processor is configured to read the programs in the memory to execute: receiving at least one network request message for establishing a communication connection with a third-party system sent by a communication device; determining a configuration rule corresponding to the network request message from a set of configuration rules, where the set of configuration rules includes configuration rules of communication protocols of different third-party systems; performing communication protocol conversion on the network request message according to the configuration rule; and sending the network request message after the communication protocol conversion to the corresponding third-party system.

As an optional embodiment, the processor is further configured to execute: receiving at least one network request message for establishing a communication connection with a non-third-party system sent by the communication device; and directly sending the network request message to the non-third-party system.

As an optional embodiment, the processor is further configured to execute: receiving a network request message from the communication device, determining that the network request message is a network request message for establishing a communication connection with a third-party system, or determining that the network request message is a network request message for establishing a communication connection with a non-third-party system.

As an optional embodiment, the processor is configured to execute: determining a configuration rule corresponding to the route information from the set of configuration rules according to the route information carried in the network request message.

As an optional embodiment, the configuration rule is in a one-to-one correspondence with the route information; or, the multiple pieces of route information correspond to the same configuration rule.

As an optional embodiment, the processor is configured to execute: determining a third-party system corresponding to the route information according to the route information carried in the network request message; and determining a configuration rule corresponding to the third-party system from the set of configuration rules.

As an optional embodiment, the processor is configured to execute: obtaining a process of protocol conversion by instantiating protocol conversion rules in the configuration rule; and performing communication protocol conversion on the network request message through the process of protocol conversion.

As an optional embodiment, the processor is configured to execute: in a case that the configuration rule includes a software development kit file of the third-party system, loading the software development kit file of the third-party system via a class loader to obtain a process of executing the software development kit file, where the software development kit file is in a one-to-one correspondence with the third-party system.

As an optional embodiment, the processor is configured to execute: performing digital signature and encryption on the network request message by the process of executing the software development kit file.

As an optional embodiment, the processor is further configured to execute: loading the software development kit (sdk) file of the third-party system via a class loader; and storing the loaded sdk file in the set of configuration rules, where the sdk file is in a one-to-one correspondence with the third-party system.

As an optional embodiment, the processor is configured to execute: sending the network request message after the communication protocol conversion to a third-party system corresponding to the route information according to the route information carried in the network request message.

As an optional embodiment, after sending the network request message after the communication protocol conversion to the corresponding third-party system, the processor is further configured to execute: receiving a network response message from the third-party system, and determining the configuration rule of the third-party system from the set of configuration rules; performing communication protocol conversion on the network response message according to the configuration rule; and sending the network response message after the communication protocol conversion to the communication device.

As an optional embodiment, the processor is configured to execute: obtaining a process of protocol conversion by instantiating protocol conversion rules in the configuration rule; and performing communication protocol conversion on the network response message via the process of protocol conversion.

As an optional embodiment, the processor is configured to execute: sending the network response message after the communication protocol conversion to the communication device at a source address according to the source address in the network request message.

As an optional embodiment, after receiving the network request message for establishing a communication connection with the third-party system sent by the communication device, the processor is further configured to execute: determining access token information in the configuration rule corresponding to the network request message; and periodically sending a connection request message for maintaining a session connection to the third-party system according to the access token information.

As an optional embodiment, after the periodically sending the connection request message for maintaining a session connection to the third-party system, the processor is further configured to execute: receiving the access token from the third-party system, accessing a probing interface of the third-party system according to a preset period, and determining the validity of the access token.

As an optional embodiment, after determining the validity of the access token, the processor is further configured to: in a case that the access token is invalid, prompting the user through a display interface that the access token of the third-party system is invalid.

As an optional embodiment, after determining the validity of the access token, the processor is further configured to: in a case that the access token is invalid, reacquiring a valid access token of the third-party system, and updating the access token of the third-party system in the configuration rule by using the valid access token.

As an optional embodiment, the processor is configured to execute: resending a connection request message for maintaining a session connection to the third-party system according to the access token information in the configuration rule corresponding to the network request message; and receiving a valid access token from the third-party system.

As an optional embodiment, the processor is further configured to execute: receiving at least one instruction of deleting, modifying, or adding a configuration rule from the user through the display interface.

As an optional embodiment, the processor is further configured to execute: receiving at least one instruction of the user performing a touch operation or a voice control operation on the configuration rule on the display interface, and triggering the execution of an operation corresponding to the instruction on the configuration rule; or, receiving at least one instruction of the user performing a touch operation or a voice control operation on the configuration rule in a pop-up window on the display interface, and triggering the execution of an operation corresponding to the instruction on the configuration rule.

As an optional embodiment, after receiving at least one instruction of deleting, modifying, or adding a configuration rule from the user through the display interface, the processor is further configured to execute: receiving a database synchronization instruction triggered by the user through the display interface, and updating the set of configuration rules; or, updating the set of configuration rules according to a preset period.

As an optional embodiment, the processor is configured to execute: in a case that a change of a configuration rule in the set of configuration rules is monitored through a monitoring process, notifying an update process of updating the set of configuration rules; or, storing the set of configuration rules in a message queue and monitoring content of the message queue, and updating the content of the message queue in a case that a change of a configuration rule in the set of configuration rules is monitored.

As an optional embodiment, the processor is configured to execute: in a case that a new configuration rule exists, updating the set of configuration rules according to the new configuration rule; or, in a case that a configuration rule in the set of configuration rules is deleted, updating the set of configuration rules according to the deleted configuration rule; or, in a case that a configuration rule in the set of configuration rules is modified, updating the set of configuration rules according to the modified configuration rule.

As an optional embodiment, the configuration rules include at least one of a routing rule, an encoding and decoding rule or a protocol conversion rule. The protocol conversion rules include at least one of a token configuration rule, a digital signature configuration rule, a message configuration rule, or a configuration rule using a software development kit file.

In a fifth aspect, an embodiment of the present disclosure further provides a general communication protocol conversion device. The device includes: a receiving message component, configured to receive at least one network request message for establishing a communication connection with a third-party system sent by the communication device; a determination rule component, configured to determine a configuration rule corresponding to the network request message from a set of configuration rules, where the set of configuration rules includes configuration rules of communication protocols of different third-party systems; a protocol conversion component, configured to perform communication protocol conversion on the network request message according to the configuration rule; a message sending component, configured to send the network request message after the communication protocol conversion to the corresponding third-party system.

As an optional embodiment, the receiving message component is further configured for: receiving at least one network request message for establishing a communication connection with a non-third-party system sent by the communication device; and directly sending the network request message to the non-third-party system.

As an optional embodiment, the receiving message component is further configured for: receiving a network request message from the communication device, determining that the network request message is a network request message for establishing a communication connection with a third-party system, or determining that the network request message is a network request message for establishing a communication connection with a non-third-party system.

As an optional embodiment, the configuration rule is in a one-to-one correspondence with the route information; or, multiple pieces of route information correspond to the same configuration rule.

As an optional embodiment, the determination rule component is specifically configured for: determining the configuration rule corresponding to the route information from the set of configuration rules according to the route information carried in the network request message.

As an optional embodiment, the determination rule component is specifically configured for: determining a third-party system corresponding to the route information according to the route information carried in the network request message; and determining a configuration rule corresponding to the third-party system from the set of configuration rules.

As an optional embodiment, the protocol conversion component is specifically configured for: obtaining a process of protocol conversion by instantiating protocol conversion rules in the configuration rule; and performing communication protocol conversion on the network request message through the process of protocol conversion.

As an optional embodiment, the protocol conversion component is specifically further configured for: in a case that the configuration rule includes a software development kit file of the third-party system, loading the software development kit file of the third-party system via a class loader to obtain a process of executing the software development kit file, where the software development kit file is in a one-to-one correspondence with the third-party system.

As an optional embodiment, the protocol conversion component is specifically further configured for: performing digital signature and encryption on the network request message by the process of executing the software development kit file.

As an optional embodiment, the device further includes a loading component specifically configured for: loading the software development kit (sdk) file of the third-party system via a class loader; and storing the loaded sdk file in the set of configuration rules, where the sdk file is in a one-to-one correspondence with the third-party system.

As an optional embodiment, the message sending component is specifically configured for: sending the network request message after the communication protocol conversion to a third-party system corresponding to the route information according to the route information carried in the network request message.

As an optional embodiment, after sending the network request message after the communication protocol conversion to the corresponding third-party system, the message sending component is further configured for: receiving a network response message from the third-party system, and determining the configuration rule of the third-party system from the set of configuration rules; performing communication protocol conversion on the network response message according to the configuration rule; and sending the network response message after the communication protocol conversion to the communication device.

As an optional embodiment, the message sending component is specifically further configured for: obtaining a process of protocol conversion by instantiating protocol conversion rules in the configuration rule; and performing communication protocol conversion on the network response message via the process of protocol conversion.

As an optional embodiment, the message sending component is specifically further configured for: sending the network response message after the communication protocol conversion to the communication device at a source address according to the source address in the network request message.

As an optional embodiment, after receiving the network request message for establishing a communication connection with the third-party system sent by the communication device, the device further includes: a session connection component specifically configured for: determining access token information in the configuration rule corresponding to the network request message; and periodically sending a connection request message for maintaining a session connection to the third-party system according to the access token information.

As an optional embodiment, after the periodically sending the connection request message for maintaining a session connection to the third-party system, the session connection component is specifically further configured for: receiving a access token from the third-party system, accessing a probing interface of the third-party system according to a preset period, and determining the validity of the access token.

As an optional embodiment, after the determining the validity of the access token, the device further includes a display component configured for: in a case that the access token is invalid, prompting the user through a display interface that the access token of the third-party system is invalid.

As an optional embodiment, after determining the validity of the access token, the session connection component is further configured for: in a case that the access token is invalid, reacquiring a valid access token of the third-party system, and updating the access token of the third-party system in the configuration rule by using the valid access token.

As an optional embodiment, the session connection component is specifically configured for: resending a connection request message for maintaining a session connection to the third-party system according to the access token information in the configuration rule corresponding to the network request message; and receiving a valid access token from the third-party system.

As an optional embodiment, the device further includes a receiving instruction component specifically configured for: receiving at least one instruction of deleting, modifying, or adding a configuration rule from the user through the display interface.

As an optional embodiment, the receiving instruction component is specifically further configured for: receiving at least one instruction of the user performing a touch operation or a voice control operation on the configuration rule on the display interface, and triggering the execution of an operation corresponding to the instruction on the configuration rule; or, receiving at least one instruction of the user performing a touch operation or a voice control operation on the configuration rule in a pop-up window on the display interface, and triggering the execution of an operation corresponding to the instruction on the configuration rule.

As an optional embodiment, after receiving at least one instruction of deleting, modifying, or adding a configuration rule from the user through the display interface, the device further includes an update component specifically configured for: receiving a database synchronization instruction triggered by the user through the display interface, and updating the set of configuration rules; or, updating the set of configuration rules according to a preset period.

As an optional embodiment, the updating component is specifically configured for: in a case that a change of a configuration rule in the set of configuration rules is monitored through a monitoring process, notifying an update process of updating the set of configuration rules; or, storing the set of configuration rules in a message queue and monitoring the content of the message queue, and updating the content of the message queue in a case that a change of a configuration rule in the set of configuration rules is monitored.

As an optional embodiment, the updating component is specifically configured for: in a case that a new configuration rule exists, updating the set of configuration rules according to the new configuration rule; or, in a case that a configuration rule in the set of configuration rules is deleted, updating the set of configuration rules according to the deleted configuration rule; or, in a case that a configuration rule in the set of configuration rules is modified, updating the set of configuration rules according to the modified configuration rule.

As an optional embodiment, the configuration rules include at least one of a routing rule, an encoding and decoding rule, or a protocol conversion rule. The protocol conversion rules include at least one of a token configuration rule, a digital signature configuration rule, a message configuration rule, or a configuration rule using a software development kit file.

In a sixth aspect, an embodiment of the present disclosure further provides a computer storage medium, on which computer programs are stored. The programs are executed by a processor to implement the operations of any method in the first aspect.

BRIEF DESCRIPTION OF FIGURES

In order to illustrate the technical solutions in the embodiments of the present disclosure more clearly, the drawings that need to be used in the description of the embodiments will be briefly introduced below. Obviously, the drawings in the following description are only part of embodiments of the present disclosure. For those ordinary skilled in the art can also obtain other drawings based on these drawings without any creative effort.

FIG. 3C is an interface diagram provided by an embodiment of the present disclosure.

FIG. 3D is an interface diagram of a pull-down menu provided by an embodiment of the present disclosure.

FIG. 4A is a schematic diagram of a data packet structure of a network request message provided by an embodiment of the present disclosure.

FIG. 4B is a schematic diagram of a protocol structure of a network request message provided by an embodiment of the present disclosure.

FIG. 5 is a schematic diagram of a display interface of route information and corresponding configuration rules provided by an embodiment of the present disclosure.

FIG. 11A is a schematic diagram of a route editing interface provided by an embodiment of the present disclosure.

FIG. 11B is a schematic diagram of an overall editing interface of a token provided by an embodiment of the present disclosure.

FIG. 11C is a schematic diagram of a token-editing interface provided by an embodiment of the present disclosure.

FIG. 13A is a comparison diagram before and after a first protocol conversion provided by an embodiment of the present disclosure.

FIG. 13B is a comparison diagram before and after a second protocol conversion provided by an embodiment of the present disclosure.

FIG. 14 is a schematic diagram of a communication protocol conversion system provided by an embodiment of the present disclosure.

DETAILED DESCRIPTION

Figure 1:
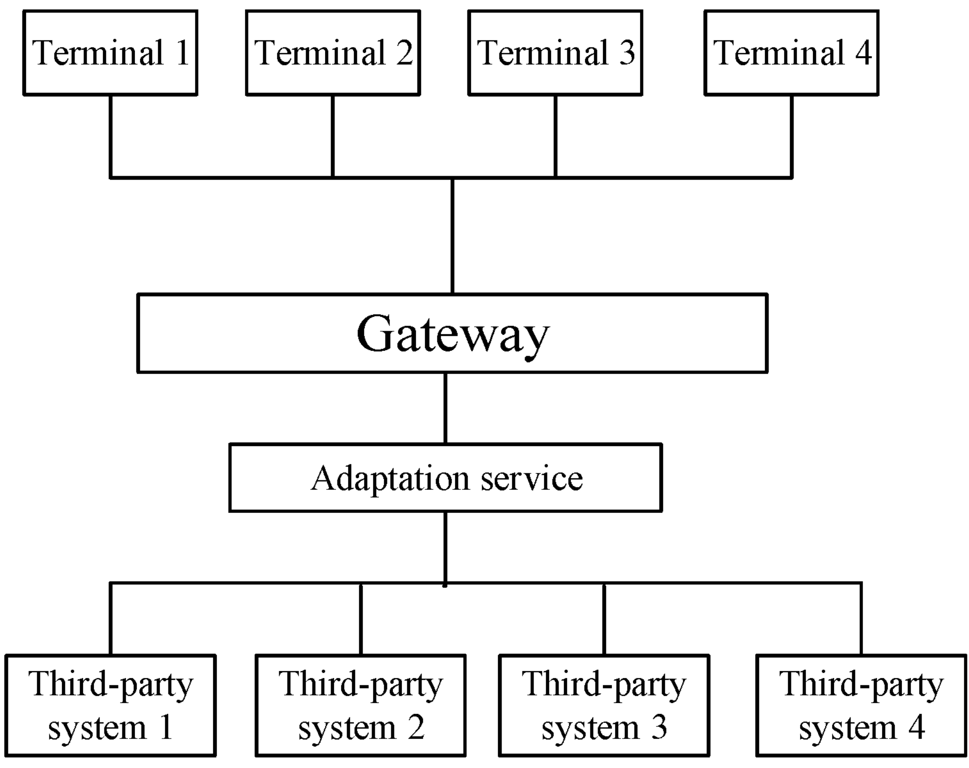
FIG. 1 is a schematic diagram of a network structure for implementing protocol conversion through an adapter service provided by an embodiment of the present disclosure.

In order to make the purpose, technical solutions and advantages of the present disclosure clearer, the present disclosure will be further described in detail below in conjunction with the accompanying drawings. Apparently, the described embodiments are only part but not all of the embodiments of the present disclosure. Based on the embodiments in the present disclosure, all other embodiments obtained by those ordinary skilled in the art without creative efforts fall within the protection scope of the present disclosure.

The term "and/or" in the embodiments of the present disclosure describes an association relationship between associated objects, indicating that there may be three relationships, for example, A and/or B, which may mean: A exists alone, A and B exist concurrently, and B exists alone. The character "/" generally indicates that the contextual objects are an "or" relationship.

The term "Java virtual machine (JVM)" in the embodiments of the present disclosure refers to a specification of a computer device, which is an abstract computer, and realizes corresponding functions by simulating various computer functions on a real computer. Here, after the Java virtual machine is introduced, the Java language does not need to be recompiled when running on different platforms. The Java language uses the Java virtual machine to shield the information associated with the specific platform, so that the Java language compiler only needs to generate object codes (byte codes) running on the Java virtual machine, to thereby achieve running without modification on various platforms.

The term "software development kit (sdk)" in the embodiments of the present disclosure refers to a collection of development tools for building application software, such as specific software packages, software frameworks, hardware platforms, and operating systems, etc.

The term "digital signature" in the embodiments of the present disclosure refers to an unforgeable digital string generated by an information sender. The digital string is also an effective proof of the authenticity of the information sent by the information sender. It is a method for identifying digital information by using technologies in the field of public key encryption.

The term "session" in the embodiments of the present disclosure is called "session control" in computers. A session object stores attributes and configuration information for a specific user session. When the user browses Web pages of applications, the variables stored in the session object will not be lost, but exist in the user's entire session.

The term "remote dictionary server (Redis)" in the embodiments of the present disclosure refers to a Key-Value database of a log type. The redis is an open source database that is written in ANSI C language, supports the network, and is based on the memory or persistent, and provides an application programming interface (API) with multiple languages.

The term "dynamic class loading" in the embodiments of the present disclosure refers to reading a class file of a class (a file after compiling java codes) into the memory and creating an object for the class file, and the loading of the class is completed through a class loader.

The application scenarios described in the embodiments of the present disclosure are to illustrate the technical solutions of the embodiments of the present disclosure more clearly, and do not limit the technical solutions provided by the embodiments of the present disclosure. Those skilled in the art know that with the emergence of new application scenarios, the technical solutions provided by the embodiments of the present disclosure are also applicable to similar technical problems. Here, in the description of the present disclosure, unless otherwise specified, the term "a plurality of" or "multiple" means two or more.

With the development of cloud services, the Internet of Things or Internet manufacturers have developed cloud service systems for their own products. In the actual production process, products, systems and services from multiple third parties are needed to build their own schemes. However, the products from different manufacturers have different communication protocols, different authentication manners, and independent databases. If an adapter service for protocol conversion is developed separately for each third-party system, the efficiency is lower. If the codes of all adapter modules run in an adapter service, when a third-party service is newly connected or deactivated, the adapter module needs to be repackaged, recompiled and redeployed, thus during the restart process, its own service and all communications with third-party services will be interrupted. If multiple adapter services are deployed to form a cluster to achieve high availability, hardware resources will be wasted. As shown in FIG. 1, at present, for multiple third-party systems, the protocol conversion is realized through a separately developed protocol conversion adapter service. The adapter service is between a gateway and multiple third-party systems. Since all protocol conversion codes are running in the same adapter service, in a case that new codes are added to the adapter service when a third-party system is newly connected, it is necessary to repackage, recompile and redeploy the adapter module, which will inevitably lead to communication interruption between multiple users and third-party systems. In order to solve this technical problem, the embodiments of the present disclosure provide a general, dynamically configurable communication protocol conversion method, for configuration rules for different third-party systems, corresponding communication protocols are configured for different third-party systems, when a new third-party system is added, it is only necessary to add a new configuration rule to the set of configuration rules. When the configuration rule is implemented, a new configuration rule is implemented via a newly added process instead of adding new codes, thus there is no need to repackage, recompile and redeploy, which solves the problem of low efficiency caused by traditional customized and developed adapter services.

The core concept of the design in the present disclosure is to use configuration rules of communication protocols of different third-party systems included in the set of configuration rules to select a configuration rule corresponding to a received network request message, and send the network request message after the communication protocol conversion to a third-party system, to establish a communication connection between a terminal and the third-party system. Since the configuration rules of different third-party systems are pre-stored in the embodiments, the corresponding configuration rules can be used to perform communication protocol conversion on different network request messages received, and a general protocol conversion method is provided. If a configuration rule corresponding to a third-party system is added, deleted or modified, since the codes are not added, deleted or modified, there is no need to recompile and redeploy, which solves the problem of inefficiency caused by traditional customized and developed adapter services.

Figure 2A:
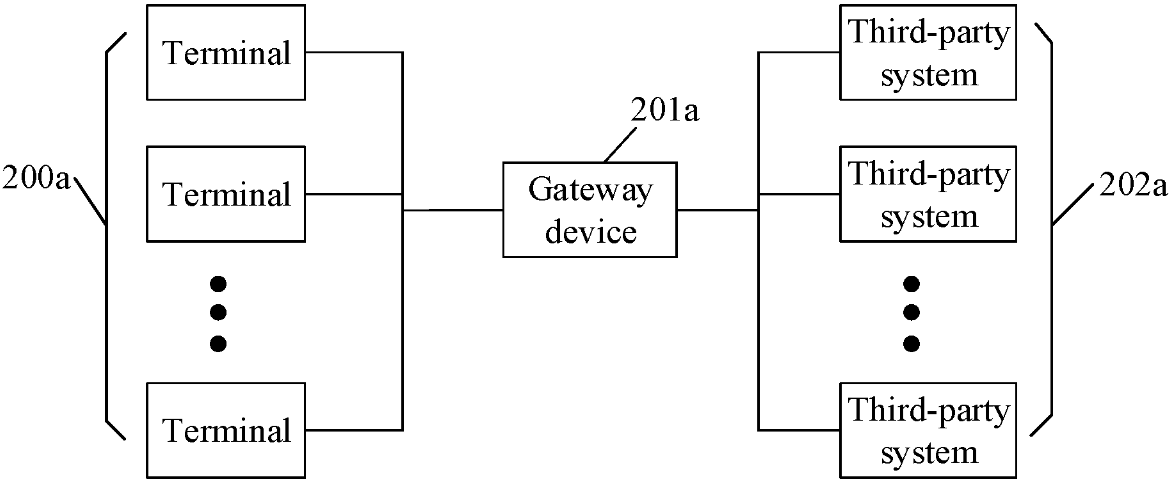
FIG. 2A is a schematic diagram of a network architecture of a first communication protocol conversion provided by an embodiment of the present disclosure.
Figure 2B:
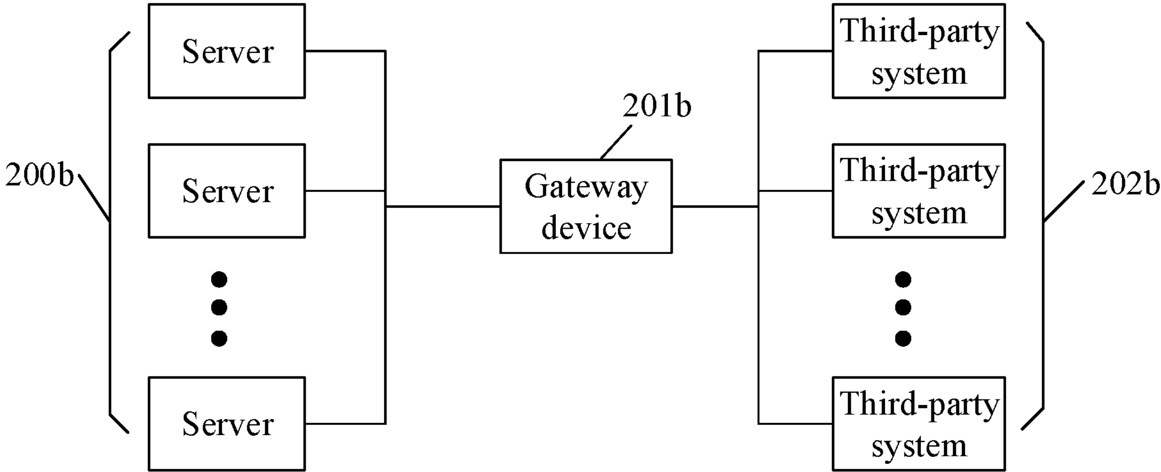
FIG. 2B is a schematic diagram of a network architecture of a second communication protocol conversion provided by an embodiment of the present disclosure.
Figure 2C:
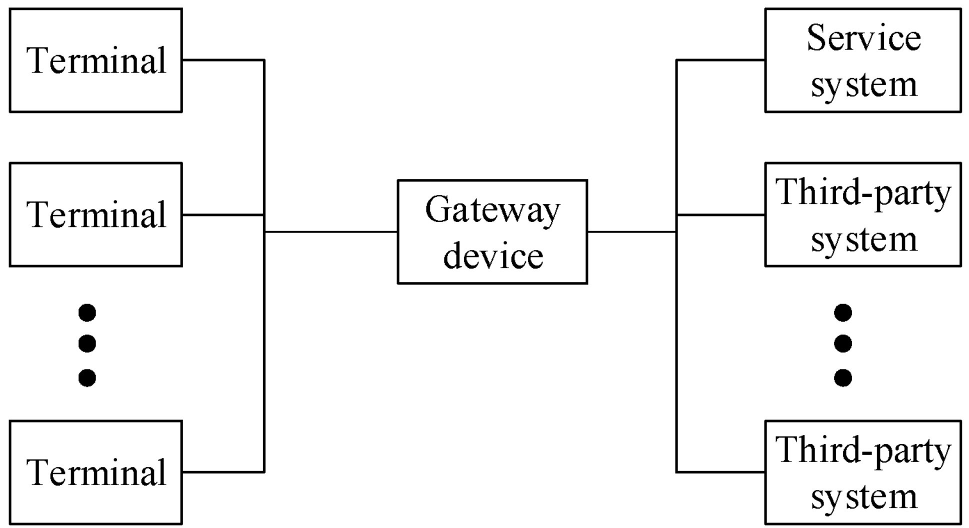
FIG. 2C is a schematic diagram of a network architecture of a third communication protocol conversion provided by an embodiment of the present disclosure.

In some embodiments, a communication protocol conversion method provided in the embodiments can be applied to a gateway device or other server devices. If the method is applied to the gateway device, a network architecture of communication protocol conversion provided in the embodiments is shown in FIG. 2A. The network architecture includes at least one terminal 200*a*, a gateway device 201*a*, and a plurality of third-party systems 202*a*; alternatively, a network architecture of communication protocol conversion provided by the embodiments is shown in FIG. 2B. The network architecture includes at least one server 200*b*, a gateway device 201*b*, and a plurality of third-party systems 202*b*. Here, the communication protocol conversion method provided in the embodiments is deployed on the gateway device and integrated with the function of the gateway device itself. When a new third-party system is added, a corresponding configuration rule can be added to the set of configuration rules stored in the gateway device, that is, the configuration rule of the new third-party system is added. After instantiating the configuration rule, a process obtained after instantiating the configuration rule is used to perform communication protocol conversion on the network request message from a user terminal, which can ensure that the normal operations of the previous third-party systems will not be affected after adding the new third-party system. Here, the principle of deleting or modifying a configuration rule is the same as the principle of adding a new configuration rule, which will not be repeated herein. In actual implementations, the service system of its own may be combined with a third-party system, and a network architecture is shown in FIG. 2C, where a terminal is used as the communication device as an example, and the communication protocol conversion method provided by the embodiments is deployed on the gateway device, which enables a plurality of terminals to communicate with their own service systems and third-party systems.

Figure 2D:
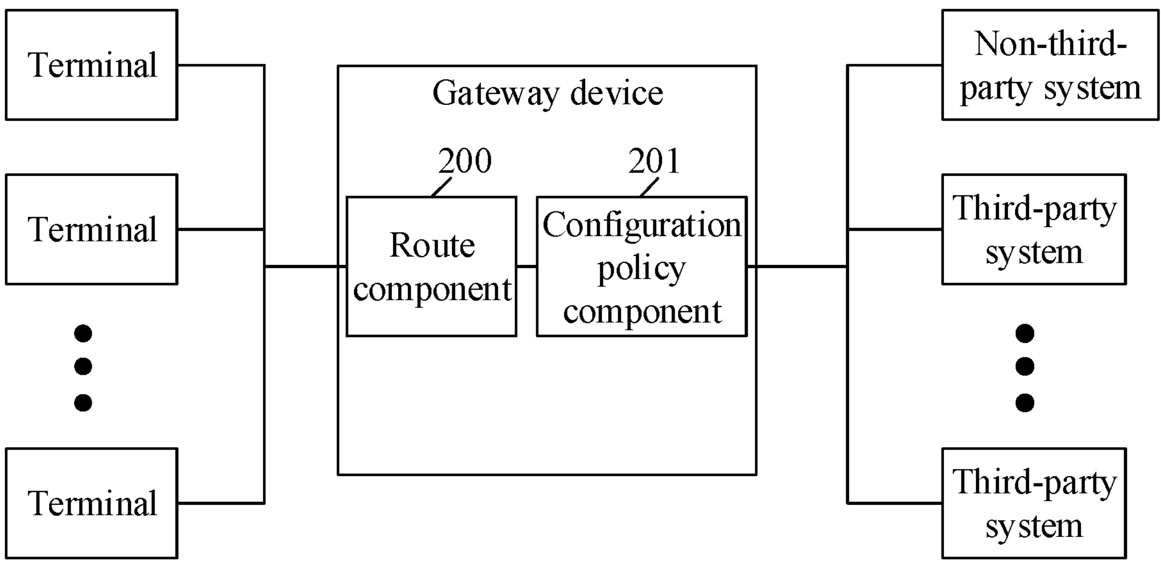
FIG. 2D is a schematic diagram of a structure of a gateway device provided by an embodiment of the present disclosure.

In some embodiments, as shown in FIG. 2D, the gateway device includes a route component 200 and a configuration policy component 201. The route component 200 is configured with original functions of the gateway device itself, and is configured to provide communication services such as forwarding for its own service system (i.e., a non-third-party system), or to cooperate with the configuration policy component 201 to provide services for a third-party system. The configuration policy component 201 is configured to perform protocol conversion on the network request message sent to the third-party system according to the stored configuration rules. In the embodiments, the route component 200 and the configuration policy component 201 do not interfere with each other when serving non-third-party systems. Before performing protocol conversion, the configuration policy component 201 needs to use the encoding and decoding module 200*a* in the route component 200 to decode the received network request message, and encode the transmitted network request message; and use the route module 200*b* in the route component 200 to forward the network request message after the protocol conversion to a corresponding third-party system.

Since the route component 200 and the configuration policy component 201 in the embodiments cooperate with each other and do not interfere with each other, the gateway in the embodiments can be used for unified deployment for third-party systems and non-third-party systems. After receiving the network request message from the communication device, the gateway, through the route component 200, determines whether the network request message is used to establish a communication connection with a third-party system, or is used to establish a communication connection with a non-third-party system. A specific determination manner is to determine whether the route information includes a configuration rule according to the route information carried in the network request message; in a case that the route information includes the configuration rule, it is determined that the network request message is sent to the third-party system, and is sent to the third-party system after protocol conversion via a protocol conversion module; and in a case that the route information does not include the configuration rule, it is determined that the network request message is sent to the non-third-party system and no protocol conversion is required, and the network request message can be directly forwarded to the non-third-party system. Therefore, this determination manner can conveniently and concisely coordinate the route component and the configuration policy component to make them operate efficiently, effectively connect communication devices to different objects (third-party or non-third-party), and reduce labor costs.

In some embodiments, the gateway device the embodiments may further include a confirmation module configured to determine whether to perform processing of the configuration policy component after the route component judges the network request message. For example, after the communication device initially configures the configuration rules through an interactive interface, and subsequently establishes a communication connection with a third-party system through the gateway device, the route component does not need to judge the received network request message again, but directly determine whether to perform processing of the configuration policy component through the confirmation module, which reduces the amount of data processed by the route component in the gateway device, saves the resources of the route component in the gateway device, and ensures the efficient operation of the gateway device, especially in the case of high concurrency.

When it is determined that the network request message is a network request message for establishing a communication connection with a third-party system, the configuration policy component 201 is used to determine a configuration rule corresponding to the network request message from the set of configuration rules; perform communication protocol conversion on the network request message according to the configuration rule; and use the route component 200 to send the network request message after the communication protocol conversion to the corresponding third-party system. When the network request message is a network request message for establishing a communication connection with a non-third-party system, the route component 200 is used to directly send the network request message to the non-third-party system.

Figure 2E:
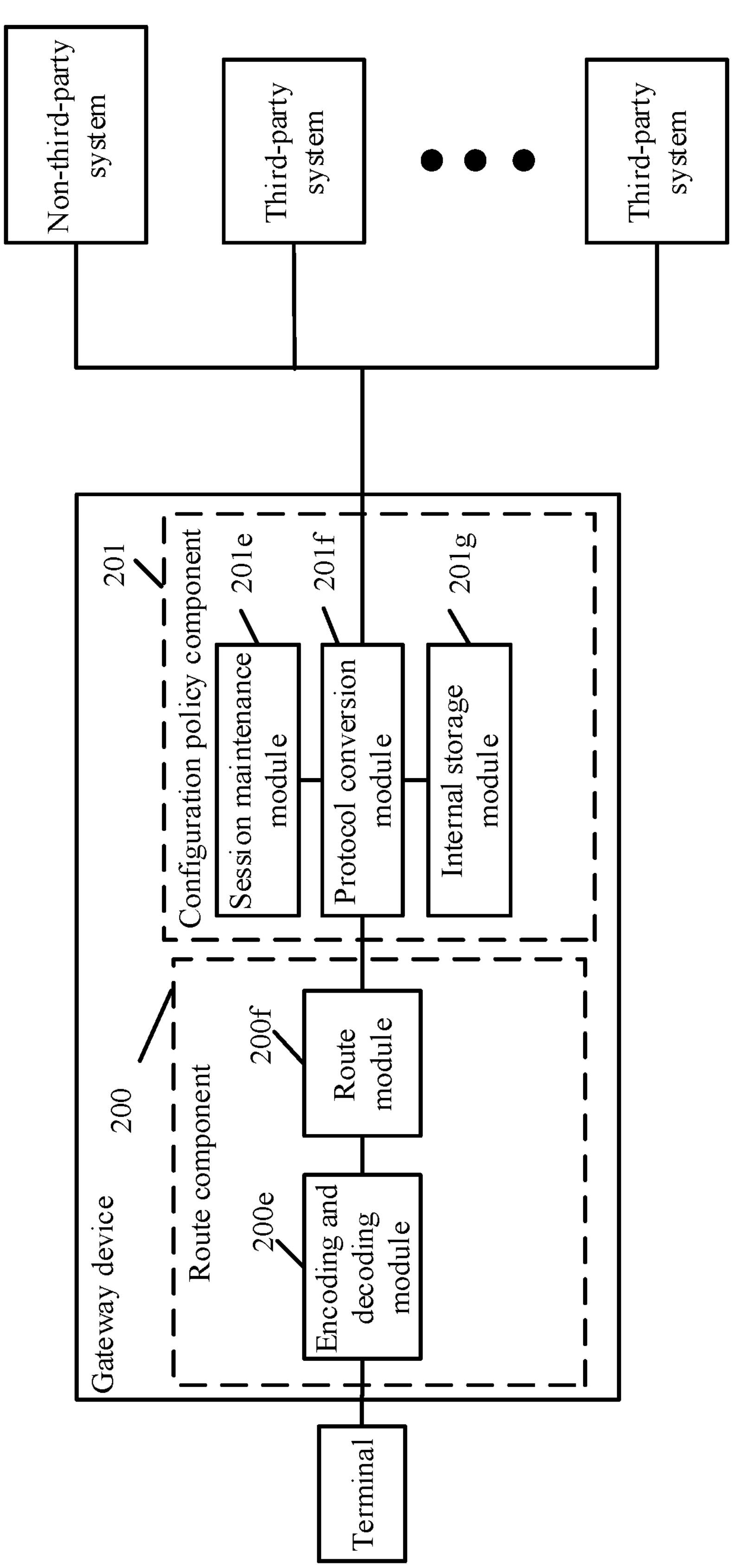
FIG. 2E is a schematic diagram of an internal structure of a gateway device provided by an embodiment of the present disclosure.

In some embodiments, as shown in FIG. 2E, the route component 200 of the gateway device the embodiments includes an encoding and decoding module 200*e* and a route module 200*f*, and the configuration policy component 201 of the gateway device includes a session maintenance module 201*e*, a protocol conversion module 201*f*, and an internal storage module 201*g*.

Here, the encoding and decoding module 200*e* is configured for decoding all received network request messages and encoding transmitted network request messages.

The route module 200*f* is configured to forward different network request messages according to corresponding configuration rules, and to determine whether the route information carried in the current network request message includes a configuration rule, and if the route information includes the configuration rule, it is determined that the network request message is sent to a third-party system after protocol conversion, and if the route information does not include the configuration rule, the network request message is directly sent to a non-third-party system (own service system).

The session maintenance module 201*e* is configured to maintain the session with the third-party system.

The protocol conversion module 201*f* is configured to convert the received network request message into a network request message that meets the requirements of the third-party system according to the corresponding configuration rule.

The internal storage module 201*g* is configured for storing configuration rules, sdk files of third-party systems and other data.

Figure 3A:
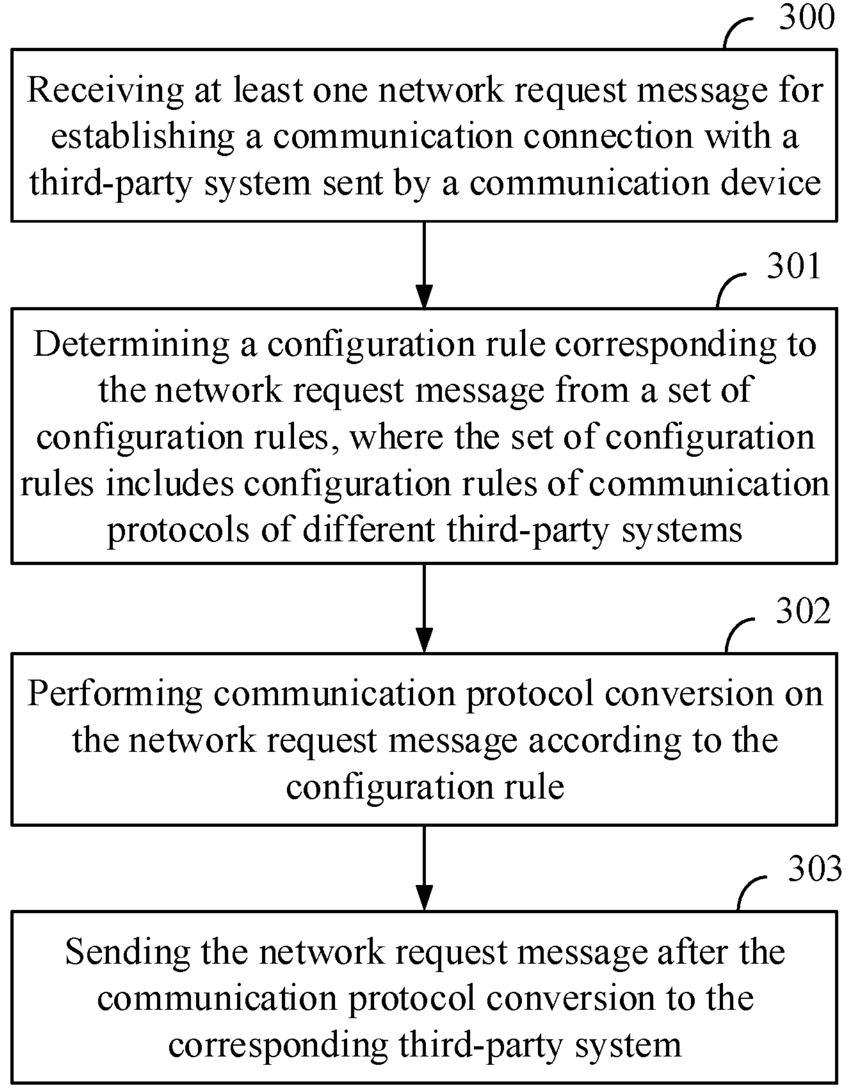
FIG. 3A is an implementation flow chart of a communication protocol conversion method provided by an embodiment of the present disclosure.

As shown in FIG. 3A, the implementation process of the communication protocol conversion method provided by the embodiments is as follows.

S300, receiving at least one network request message for establishing a communication connection with a third-party system sent by a communication device.

In some embodiments, the communication device in the embodiment includes but not limited to a terminal and a server. The third-party system in the embodiments includes but is not limited to a terminal and a server. In the embodiments, communication connections may be established between terminals and a plurality of third-party systems, or communication connections may be established between servers and a plurality of third-party systems (servers). In practical applications, it can be understood as communication connections are established between servers of enterprise and servers purchased from a third party according to actual requirements, which is not limited in the embodiments. In specific application scenarios, a server of an enterprise A is configured as a gateway device according to the communication protocol conversion method provided in the embodiments, and protocol conversion is performed on communication messages between communication devices and third-party systems.

In some embodiments, a network request message sent by a communication device is received, and the network request message carries a message for establishing a communication connection with a third-party system; or, a plurality of network request messages sent by a communication device are received, and each network request message carries a message for establishing a communication connection with a third-party system, where the network request message is in a one-to-one correspondence with the third-party system, that is, the communication device sends requests for establishing communication connections to different third-party systems by sending different network request messages.

It should be noted that the network request message in the embodiments is a data packet actually, and the structural schematic diagram of the data packet is shown in FIG. 4A. The concept of the communication protocol conversion in the embodiments is that, through an application layer protocol corresponding to a third-party system, protocol conversion is performed on the application layer protocol used by application layer data in a data packet sent from a communication device to the third-party system, and the application layer data after the protocol conversion is forwarded to the third-party system, so as to realize communications between the communication device and the third-party system. Generally speaking, since the third-party system has its own specific application layer protocol, which is different from an ordinary application layer protocol, it is necessary to convert the application layer protocol corresponding to the application layer data in the data packet of the communication device into the application layer protocol of the third-party system that needs to establish communication connections.

Here, a protocol structure used by the network request message is as shown in FIG. 4B. The application layer protocol corresponds to the application layer data in the data packet, the TCP/IP protocol corresponds to the TCP header and the IP header in the data packet, and the link layer corresponds to the Ethernet header in the data packet. It should be noted that the data packet and the corresponding protocol structure in the embodiments are only an implementation, the embodiments and the specific structure of the network request message is not limited herein. In some embodiments, the network request message includes at least one of route information, source address information, or message content.

S301, determining a configuration rule corresponding to the network request message from a set of configuration rules, where the set of configuration rules includes configuration rules of communication protocols of different third-party systems.

It should be noted that the set of configuration rules in the embodiments is pre-determined according to configuration rules corresponding to a plurality of third-party systems, and after the configuration rules of all third-party systems are generated into a set of configuration rules, the set of configuration rules is stored. In some embodiments, the set of configuration rules is stored in the internal storage module of the gateway, including but not limited to a memory or a hard disk storage. Optionally, the hard disk storage stores the set of configuration rules, including a plurality of configuration rules, and the memory is configured for instantiating each configuration rule, and “route information” and “gateway logs”, etc., can also be stored in the internal storage module. Optionally, in the embodiments, the hard disk storage adopts PostgreSQL database to realize the storage function, and the memory adopts the redis database to realize the storage function. In the embodiments, after the set of configuration rules is pre-stored by means of the above manner, instantiation is performed by using the stored set of configuration rules, thereby realizing communication protocol conversion.

In some embodiments, the configuration rules in the embodiments include at least one of a routing rule, an encoding and decoding rule, or a protocol conversion rule. The routing rule, encoding and decoding rule, or protocol conversion rule in the configuration rules is in a one-to-one correspondence with a third-party system. During implementations, mapping relationships between identifiers of third-party systems, and routing rules, coding and decoding rules, or protocol conversion rules can be established.

Here, the routing rule represents at least one of a routing format rule or a name rule. For example, different routing rules indicate different routing formats or different gateway domain names.

The encoding and decoding rule represents a manner for encoding and decoding a message, and different encoding and decoding rules can encode and decode different messages.

The protocol conversion rule include at least one of a token configuration rule, a digital signature configuration rule, a message configuration rule, or a configuration rule by means of a software development kit file.

Here, the token configuration rule represents a rule of a token used by a third-party system, such as an address of the token, a domain name of the token, a key of the token, a format of the token, and the addition or modification of a request header of the token, the addition or modification of a request body of the token, a regular expression of the token, an expiration time of the token and other rules. During implementations, effective access to all third-party systems can be ensured by modifying the token configuration rules. Since the access tokens of all cloud platforms are time-limited, a new access token needs to be requested before the access token expires, in the embodiments, by obtaining the validity of the access token in real time, and re-acquiring and updating the token after the token expires, it is ensured that a session connection with the third-party system is always established.

The digital signature configuration rule represents a digital signature rule used by a third-party system. Since most of the third-party systems currently have their own digital signature rules, the digital signature rules among the third-party systems cannot be used universally. In the embodiments, by configuring the digital signature configuration rules, digital signature rules corresponding to third-party systems can be added or modified in the network request message, to achieve universality.

The message configuration rule represents a configuration rule corresponding to a request message and a response message, such as addition or modification of a request header, addition or modification of a request body, addition or modification of a request parameter, addition or modification of a response header, addition or modification of a response body, addition or modification of a response parameter. During implementations, since each third-party system has clear and different requirements on the transmission format of the data in the network request message, and needs to add the access token of the respective third-party system, therefore, through the message configuration rule and the token configuration rule, the message format and access token are configured for universality.

The configuration rule by means of the software development kit (sdk) file means that if the third-party system does not disclose its own data encryption or digital signature algorithms and requires external access users to use the provided sdk for data encryption and digital signature, then the sdk file of the third-party system can be stored in the configuration rule, and the sdk file can be used to encrypt and digitally sign the message. Here, the sdk file is a part of the configuration rules, which can be directly loaded and used, but the specific data encryption and digital signature algorithms cannot be viewed. During implementations, when some third-party systems require to use the sdk file provided by it to carry out data encryption and digital signature to the transmitted data, the embodiments can use the configuration rule to directly add the sdk file to the set of configuration rules to realize the function of loading and using.

In some embodiments, specific protocol conversion rules in the embodiments are shown in Table 1 below.

TABLE 1

| Set of configuration rules | | |
|---|---|---|
| Rule1 | Token configuration rules | Address of the token<br>Domain name of the token<br>Key of the token<br>Format of the token<br>Addition or modification of a request header of the token<br>Addition or modification of a request body of the token<br>Regular expression of the token<br>Expiration time of the token |
| Rule2 | Rigital signature configuration rules | |
| Rule3 | Message configuration rules | Addition or modification of a request header<br>Addition or modification of a request body<br>Addition or modification of a request parameter<br>Addition or modification of a response header<br>Addition or modification of a response body<br>Addition or modification of a response parameter |
| Rule4 | Configuration rules by means of sdk files | |

The set of configuration rules provided in the embodiments is used to sort out different rules effectively, so that the system improves user's experience, and enables the user without deep professional knowledge to perform configuration in a concise and friendly manner. Furthermore, when determining the dimensions of the configuration rules, the user can select a corresponding option from different rules 1 to 4, which can effectively save time and further improve user's experience.

In addition, by adding or modifying rules of different dimensions, it is possible to prevent unnecessary information from being leaked to a requesting party or a receiving party. For example, when the third party only allows the platform to know the reference of the "token remaining times" (the gateway knows), it is usually not suitable to feed it back to the communication device (the communication device does not know).

In some embodiments, the configuration rule corresponding to the network request message is determined by determining the configuration rule corresponding to the route information from the set of configuration rules according to route information carried in the network request message.

During implementations, route information, routing rules, and third-party systems are in a one-to-one correspondence with each other. After the request message is decoded, the route information is analyzed, and the routing rule corresponding to the route information is determined, that is, the complete address (including http address information) in the route is analyzed according to the routing rule, and the third-party system corresponding to the route information is obtained. It is easy to understand that in the actual process of building multiple third-party systems, different third-party systems are usually configured with different routing rules, and different routing rules correspond to different route information, so that terminals can simultaneously establish communication connections with different configuration systems, which ensures that established different communication links are independent of each other.

In some embodiments, the correspondence between route information and configuration rules includes but is not limited to any of the following modes.

Mode 3-1, a configuration rule is in a one-to-one correspondence with route information.

Mode 3-2, multiple pieces of route information correspond to the same configuration rule.

Figure 3B:
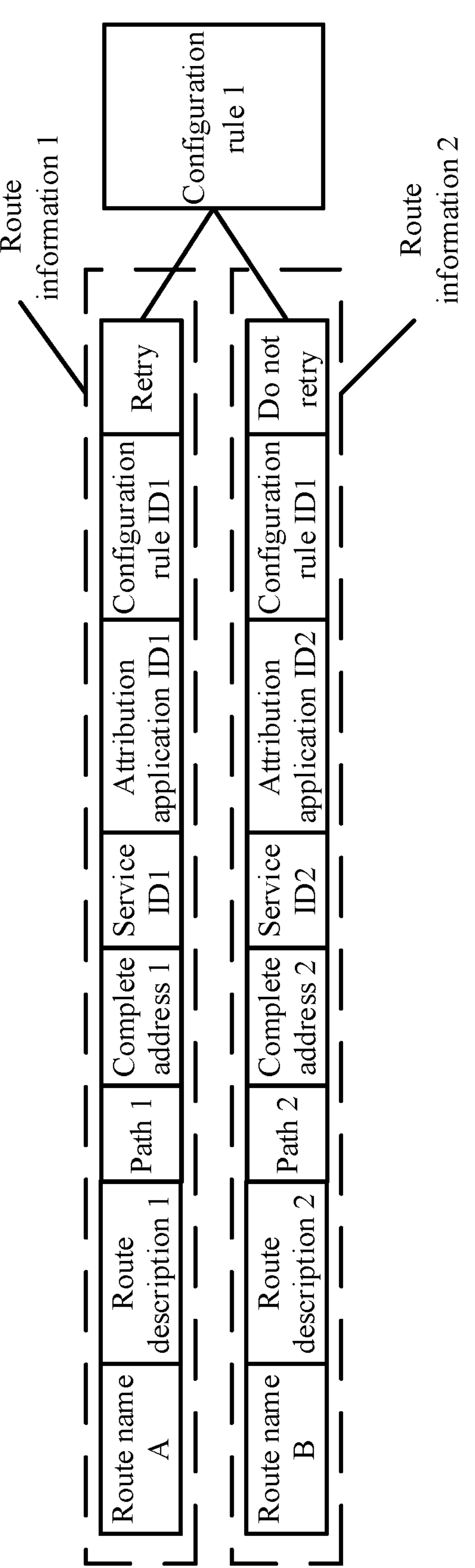
FIG. 3B is a schematic diagram of specific fields contained in route information provided by an embodiment of the present disclosure.

In some embodiments, as shown in FIG. 3B, the specific fields included in the route information include but are not limited to: a route name, route description, a path, a complete address, a service ID, an attribution application ID, a configuration rule ID, and whether to retry. The matched configuration rules are filtered out from respective configuration rules through the "configuration rule ID" field included in multiple pieces of route information. For example, route information 1 and route information 2 both contain the same configuration rule ID1, which means that route information 1 and route information 2 both correspond to the same configuration rule.

Figure 3E:
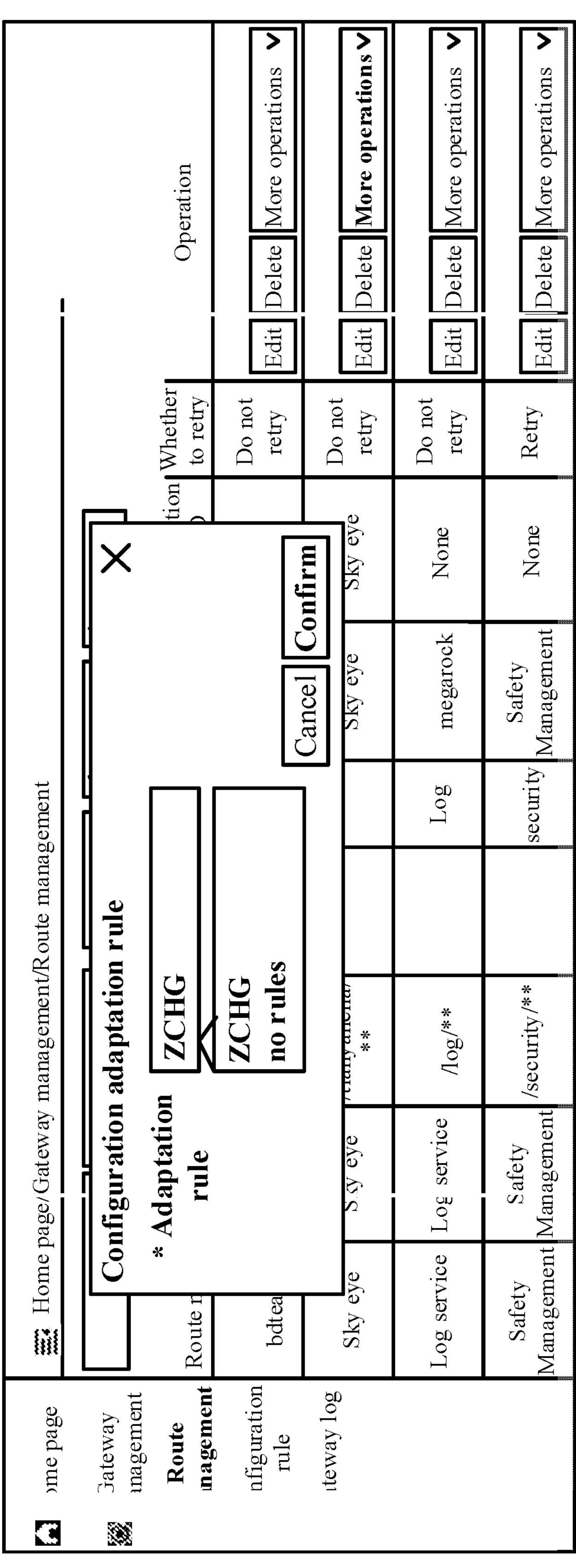
FIG. 3E is an interface diagram for configuring adaptation rules provided by an embodiment of the present disclosure.

In some embodiments, as shown in FIG. 3C, an interface diagram is provided for displaying respective fields in the route information, and the user can intuitively view respective configuration rules in different route information, and can edit or delete the configuration rules, or perform more operations on the configuration rules. Here, more operations can be displayed through a drop-down menu, as shown in FIG. 3D, when the user clicks on more operations, the drop-down menu displays "configuration adaptation rules"; as shown in FIG. 3E, after the user clicks "configuration adaptation rules" in the drop-down menu, a pop-up window will pop up on the display interface. In the pop-up window, the user can select adaptation rules. The configuration rules represent configuration rules in the embodiments. The interface provided in the embodiments can enable the user to confirm configuration rules conveniently and quickly, and realize the policy selection required by the user. Furthermore, the setting of the drop-down box is an optional one, which is consistent with "the same route information can only correspond to one configuration rule", which can effectively avoid the user's mistaken selection and improve the user's experience.

In implementations, after the user configures the adaptation rules through the display interface for the first time, the configuration adaptation rules will be stored in, for example, the confirmation module of the gateway device. When the subsequent communication connection with the third-party system is established through the gateway device, the route component does not need to judge the received network request message again, but directly determine whether it is necessary to process the configuration policy component via the configuration adaptation rules stored in the confirmation module, which reduces the amount of data processed by the route component in the gateway device, saves the resources of the route component in the gateway device, especially for high concurrency situations, ensures the efficient operation of gateway devices.

It can be understood that the same route information can only correspond to one configuration rule, and the same configuration rule can correspond to one or more pieces of route information. If multiple pieces of route information corresponds to the same configuration rule, the configuration rules of multiple third-party systems corresponding to the multiple pieces of route information are the same, thus interaction data between multiple third-party systems and terminals can be reused, and different port numbers are configured for different third-party systems, so as to solve the problem of system crashes caused by a large number of terminals interacting with multiple third-party systems at the same time, so that multiple third-party systems can achieve load balancing in this scenario. The two modes of the correspondence between configuration rules and route information provided in the embodiments can be selected according to actual needs, which is not limited herein.

During implementations, the correspondence between configuration rules and route information may be stored in the set of configuration rules, or by means of the correspondence among route information, identifiers of third-party systems and configuration rules, a configuration rule corresponding to the route information is determined from the set of configuration rules via the following operations.

S301*a*, determining the third-party system corresponding to the route information according to the route information carried in the network request message.

During implementations, the route information can be parsed according to the routing rules in the set of configuration rules. For example, an adapted routing rule can be determined and parsed according to a path in the route information. If the parsing is successful, it means that the route information matches the routing rule; otherwise, it means that the route information does not match the routing rule. The parsed route information is used to determine a third-party system corresponding to the route information. In the embodiments, the third-party system can be determined according to the route information, especially when there are a large number of third-party systems, the gateway device can determine the third-party system more easily through the route information, and then determine the configuration rule of the third-party system. The users can determine configuration rules conveniently and simply without professional knowledge, which improves the user's experience.

In order to facilitate users to better operate and maintain the system, in some embodiments, a rule configuration interface can also be displayed, as shown in FIG. 5, route information of each third-party system and corresponding configuration rules are displayed through the display interface. The displayed route information includes but is not limited to at least one of: a routing name, routing description, a path, a complete address, a service ID, or an attribution application. The displayed configuration rules include but are not limited to at least one of: a configuration rule, an ignore prefix, whether to retry, or an operation (including editing, deleting, or more operations).

S301*b*, determining the configuration rule corresponding to the third-party system from the set of configuration rules.

In some embodiments, after determining a corresponding third-party system according to the route information and determining a corresponding configuration rule according to the third-party system, the network request message sent by the terminal is decoded again by using an encoding and decoding rule (which is different from a general encoding and decoding rule) in the configuration rule, and communication protocol conversion is performed on the decoded network request message again.

S302, performing communication protocol conversion on the network request message according to the configuration rule.

In some embodiments, before performing the communication protocol conversion on the network request message according to the configuration rule, the method further includes: determining that the configuration rule takes effect.

During implementations, after adding the configuration rule of the third-party system to the set of configuration rules, whether the configuration rule is in effect is determined by determining whether an effective instruction indicated by the user has been received, so as to use the effective configuration rule to perform the communication protocol conversion on the network request message. That is, if the configuration rule takes effect, the communication protocol conversion is performed on the network request message according to the configuration rule; otherwise, the communication protocol conversion is not performed.

In some embodiments, communication protocol conversion is performed through the following operations.

S302*a*, obtaining a process of protocol conversion by instantiating protocol conversion rules in the configuration rule.

It should be noted that the instantiation process is used to represent a process of creating one or more executable processes according to specified codes. Since the codes need to be instantiated before being executed, in the embodiments, after the protocol conversion rules are instantiated, a process of protocol conversion by using the protocol conversion rules can be obtained.

S302*b*, performing the communication protocol conversion on the network request message via the process of protocol conversion. During specific implementation, the network request message undergoes communication protocol conversion for the network request message through one or more processes of protocol conversion.

In some embodiments, if the configuration rule includes a software development kit (sdk) file of a third-party system, a class loader is used to load the software development kit file of the third-party system, and a process of executing the software development kit file is obtained. The network request message is digitally signed and encrypted through the process of executing the software development kit file. The software development kit file is in a one-to-one correspondence with the third-party system.

In the specific implementations, the sdk file includes a series of class files. Loading means that the class files compiled from the sdk file are read into the memory of the gateway device, and an object is created for the class files. The class loading is completed by the class loader. The class loader can be provided by JVM, or can be created by inheriting a class loader-based class. By using different class loaders, the binary data of the class can be loaded from different sources.

In implementations, the configuration rules of all third-party systems are pre-determined, including the sdk files required by the third-party systems, and a set of configuration rules is generated from all configuration rules and sdk files and stored in the internal storage module. When performing protocol conversion, all the configuration rules and sdk files in the set of configuration rules can be instantiated first. After receiving the request message, the gateway device can determine the corresponding configuration rule according to the route information in the network request message, and use the process of protocol conversion which is obtained after instantiation and corresponds to the configuration rule to perform communication protocol conversion.

In some embodiments, the protocol conversion rules in the embodiments include any one or more of the following rules.

1) Token Configuration Rules.

It specifically includes any or more of the following: an address for obtaining the token, a domain name for obtaining the token, an http method for obtaining the token, addition or modification of a request body for obtaining the token, addition or modification of a request header for obtaining the token, a regular expression for obtaining the token, an expiration time of the token, a key of the token, a format of the token, validity check uri of the token, an expiration string of the token, or selection of adding after the url or in a request header.

2) Digital Signature Configuration Rules.

It specifically includes any or more of the following: a digital signature algorithm, a digital signature range (the selection of a body or body&headers), a digital signature key, or a data encryption algorithm.

3) Message Configuration Rules.

It specifically includes any or more of the following: addition or modification of a request header, removal of a request header, addition or modification of a request body, addition or modification of a request parameter, addition of a session, removal of a session, addition or modification of a response header, removal of a response header, addition or modification of a response body, removal of a response body, a redirect address, a forward address, modification of response codes.

3-1) Configuration rules of uniform resource identifier (URI), specifically including changing the request URI.

3-2) Configuration rules of a message header, specifically including at least one of addition of a request header, modification of a request header, removal of a specified request header, removal of a specified response header, or modification of a response header.

3-3) Configuration rules of a message parameter, specifically including at least one of addition of a request parameter, modification of a request parameter, or modification of a response parameter.

3-4) Configuration rules of message encryption, specifically including encryption of request data.

3-5) Configuration rules of a message signature, specifically including digital signature performed on a request message.

3-6) Configuration rules of Hypertext transfer protocol (HTTP) status codes, specifically including at least one of a method for modifying an HTTP request, modification of HTTP status codes, a circuit breaker (can be understood as blacklist, interception function), ignoring a prefix, or removal of a session.

3-7) Message redirection rules.

3-8) Forwarding rules.

4) Configuration rules by means of a software development kit (sdk) file.

The data encryption algorithm and data signature algorithm of the sdk file are used to perform data encryption and data signature on the request message.

S303, sending the network request message after the communication protocol conversion to the corresponding third-party system.

During implementations, before sending the network request message after the communication protocol conversion to the corresponding third-party system, the network request message after the communication protocol conversion is encoded according to the encoding and decoding rule corresponding to the third-party system in the configuration rule, and the network request message after encoding is sent to the third-party system.

In some embodiments, according to route information carried in the network request message, the network request message after the communication protocol conversion is sent to a third-party system corresponding to the route information.

Through the above operations in the embodiments, for different third-party systems, when a terminal needs to establish connections with multiple different third-party systems, the above operations in the embodiments can be used to quickly take effect, which solves the problem of low efficiency caused by a large number of Internet of Things cloud platforms integrating multiple third-party systems.

In some embodiments, while receiving at least one network request message for establishing a communication connection with a third-party system sent by a communication device, at least one network request message for establishing a communication connection with a non-third-party system sent by the communication device may also be received. In the specific implementations, after receiving the network request message sent by the communication device, it first determines that whether the network request message is sent to a third-party system or a non-third-party system, specifically, the determination can be made by determining whether route information in the network request message includes a configuration rule. In a case that the route information includes the configuration rule, it is determined that the network request message is a network request message for establishing a communication connection with a third-party system, that is, the network request message is sent to a third-party system and protocol conversion is needed. In a case that the route information does not include the configuration rule, it is determined that the network request message is a network request message for establishing a communication connection with a non-third-party system, and the network request message is directly sent to the non-third-party system. In the embodiments, the gateway device can determine whether protocol conversion is needed according to the route information, thereby achieving universality.

Figure 6:
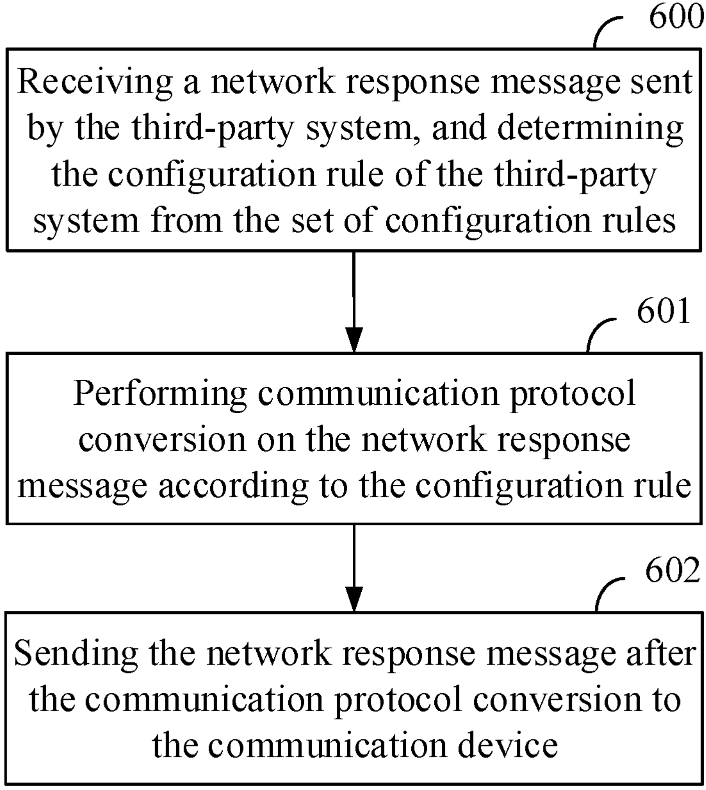
FIG. 6 is an implementation flow chart of a communication protocol conversion method provided by an embodiment of the present disclosure.

In some embodiments, a method for performing protocol conversion on a received network response message sent by a third-party system, as shown in FIG. 6, and the specific implementation operations of the method are as follows.

S600: receiving a network response message sent by the third-party system, and determining the configuration rule of the third-party system from the set of configuration rules.

It is understood that since the received network response message is sent by the third-party system, the third-party system can be determined according to the received network response message, and the configuration rule of the third-party system only needs to be determined from the set of configuration rules.

S601, performing communication protocol conversion on the network response message according to the configuration rule.

In some embodiments, communication protocol conversion is performed through the following operations.

S601*a*, obtaining a process of protocol conversion by instantiating protocol conversion rules in the configuration rules.

It should be noted that the instantiation process represents a process of creating one or more executable processes according to specified codes. Since the codes need to be instantiated before being executed, in the embodiments, after the protocol conversion rules are instantiated, a process of performing the protocol conversion by using the protocol conversion rules can be obtained.

S601*b*: performing communication protocol conversion on the network response message through the process of protocol conversion. Wherein, communication protocol conversion is performed on the network response message through one or more processes of protocol conversion.

S602: sending the network response message after the communication protocol conversion to the communication device.

In some embodiments, the network response message is sent to the communication device by: according to a source address of the network request message, sending the network response message after the communication protocol conversion to the communication device located at the source address.

In the embodiments, the network request message sent by the terminal to the third-party system may be forwarded to the third-party system after the communication protocol conversion, and the network response message sent by the third-party system to the terminal may be forwarded to the terminal after the communication protocol conversion.

Figure 7:
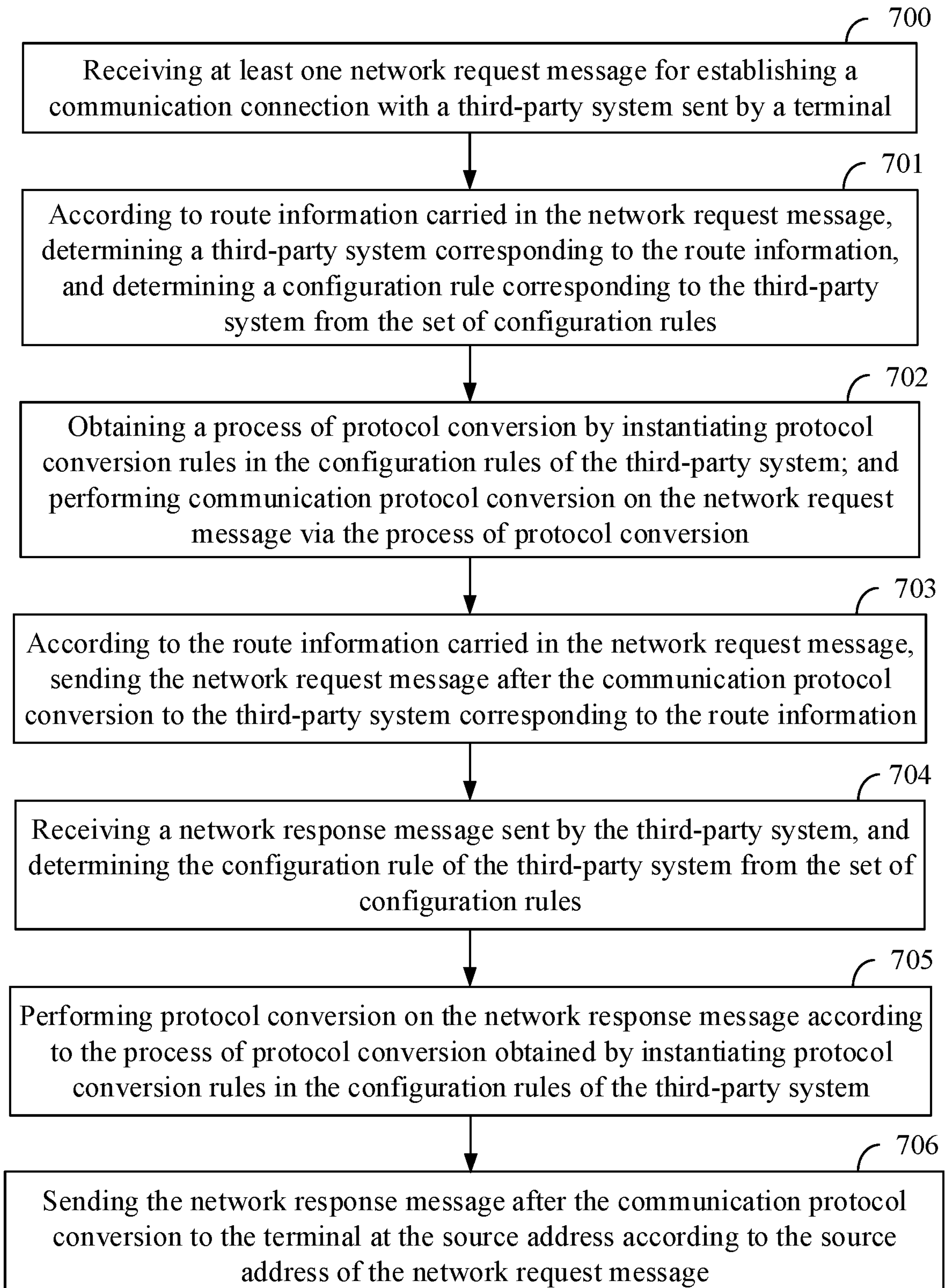
FIG. 7 is a detailed implementation flow chart of a communication protocol conversion method provided by an embodiment of the present disclosure.

In some embodiments, as shown in FIG. 7, a detailed communication protocol conversion method is further provided, and the specific implementation process of the method is as follows.

S700, receiving at least one network request message for establishing a communication connection with a third-party system sent by a terminal.

S701, according to route information carried in the network request message, determining a third-party system corresponding to the route information, and determining a configuration rule corresponding to the third-party system from the set of configuration rules.

S702, obtaining a process of protocol conversion by instantiating protocol conversion rules in the configuration rules of the third-party system; and performing communication protocol conversion on the network request message via the process of protocol conversion.

S703, according to the route information carried in the network request message, sending the network request message after the communication protocol conversion to the third-party system corresponding to the route information.

S704, receiving a network response message sent by the third-party system, and determining the configuration rule of the third-party system from the set of configuration rules.

S705, performing protocol conversion on the network response message according to the process of protocol conversion obtained by instantiating protocol conversion rules in the configuration rules of the third-party system.

S706, sending the network response message after the communication protocol conversion to the terminal at the source address according to the source address of the network request message.

Figure 8:
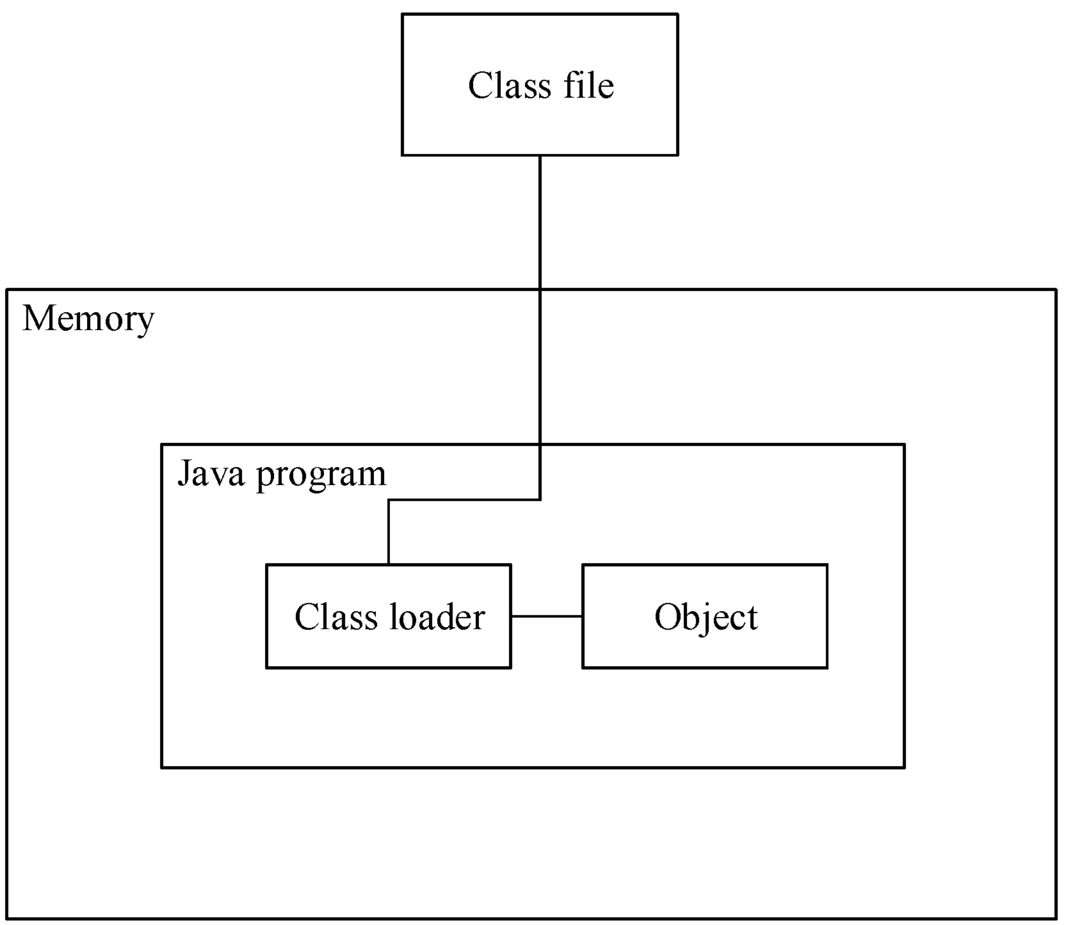
FIG. 8 is a schematic diagram of a structural relationship between a memory and a class loader provided by an embodiment of the present disclosure.

In some embodiments, the function of supporting uploading sdk files is provided, which ensures that the third-party system that uses its own data encryption and signature algorithm can still be configured with rules for the third-party system, and can directly use the uploaded and external sdk files to encrypt and sign the network request message, which is applicable to various third-party systems and has stronger versatility. The data encryption or digital signature algorithms are customized by uploading external sdk files. It should be noted that for some third-party systems that require high security, their own data encryption or digital signature algorithms are not disclosed, and external visitors are required to use the sdk files provided by the third-party system to perform digital signature and data encryption. In the embodiments of the present disclosure, by means of a java dynamic class loading technology, such third-party systems are adapted by uploading the sdk files and specifying an encryption method in the sdk files. As shown in FIG. 8, a schematic diagram of a structural relationship between a memory and a class loader is provided in the embodiments. Loading means that the class files of the class (the files after compiling java codes) into the memory (the memory of the gateway device in the embodiments). That is, the class files compiled from the sdk file are read into the memory, and an object is created for the class file. The class loading is completed by the class loader. The class loader can be provided by JVM, or can be created by inheriting a class loader-based class. By using different class loaders, the binary data of the class can be loaded from different sources.

The implementation process of the method for specifically loading the sdk file in the embodiments is as follows.

1) Utilizing the class loader to load the software development kit (sdk) file of the third-party system.

In the implementation, the class file compiled from the sdk file is read into the memory, and an object is created for the class file.

2) Storing the loaded sdk file in the set of configuration rules.

Here, the sdk file is in a one-to-one correspondence with the third-party system. When the sdk file is used, it will first determine whether there is an sdk file in the configuration rule corresponding to the network request message sent by the terminal, and if there is the sdk file in the configuration rule, the sdk file is used to digitally sign and encrypt the network request message.

Figure 9:
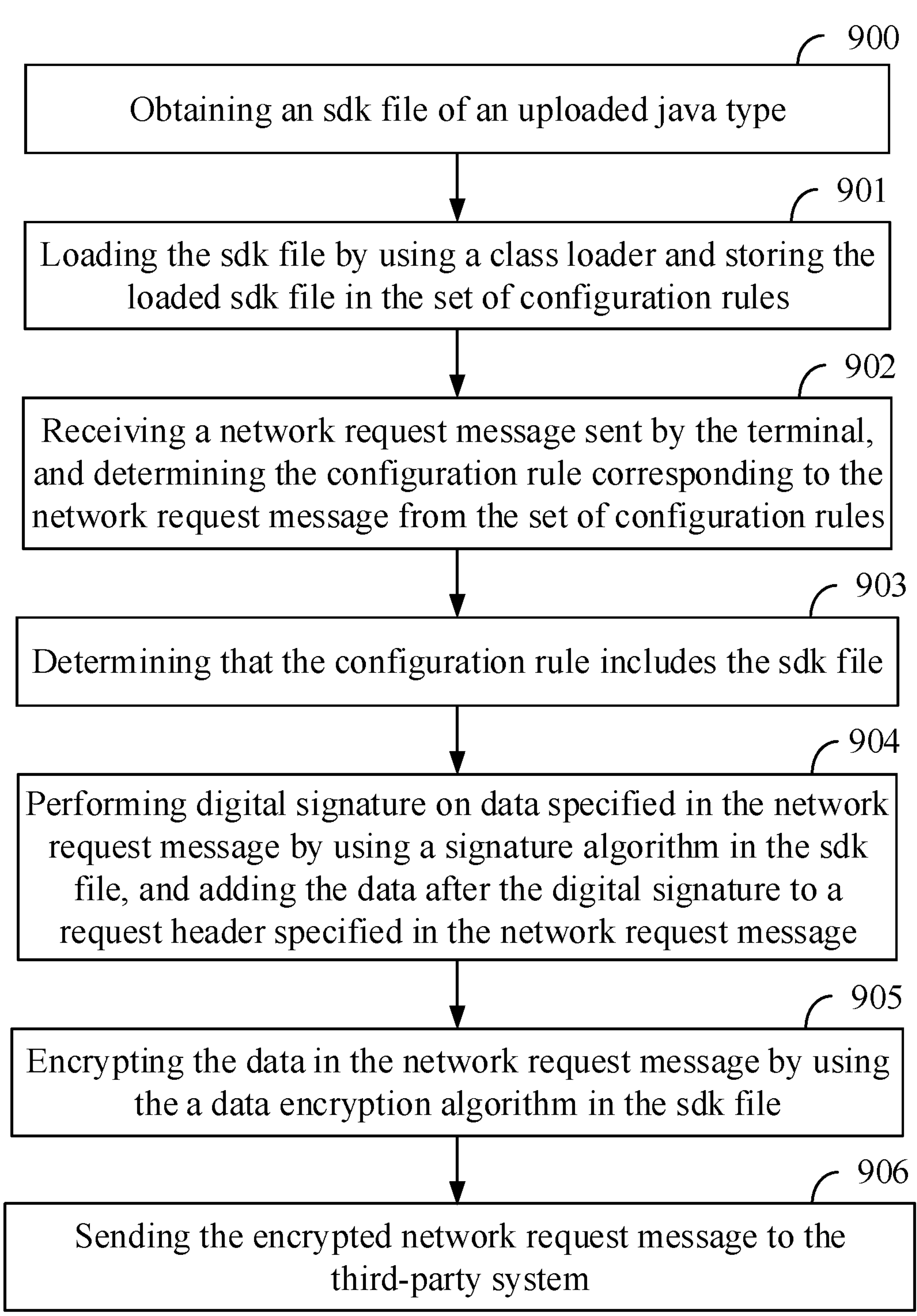
FIG. 9 is an implementation flow chart of using an externally loaded sdk file provided by an embodiment of the present disclosure.

As shown in FIG. 9, the implementation process of using an externally loaded sdk file provided by the embodiments is as follows.

S900, obtaining an sdk file of an uploaded java type.

S901, loading the sdk file by using a class loader and storing the loaded sdk file in the set of configuration rules.

S902, receiving a network request message sent by the terminal, and determining the configuration rule corresponding to the network request message from the set of configuration rules.

S903, determining that the configuration rule includes the sdk file.

S904, performing digital signature on data specified in the network request message by using a signature algorithm in the sdk file, and adding the data after the digital signature to a request header specified in the network request message.

S905, encrypting the data in the network request message by using a data encryption algorithm in the sdk file.

S906: sending the encrypted network request message to the third-party system.

Figure 10A:
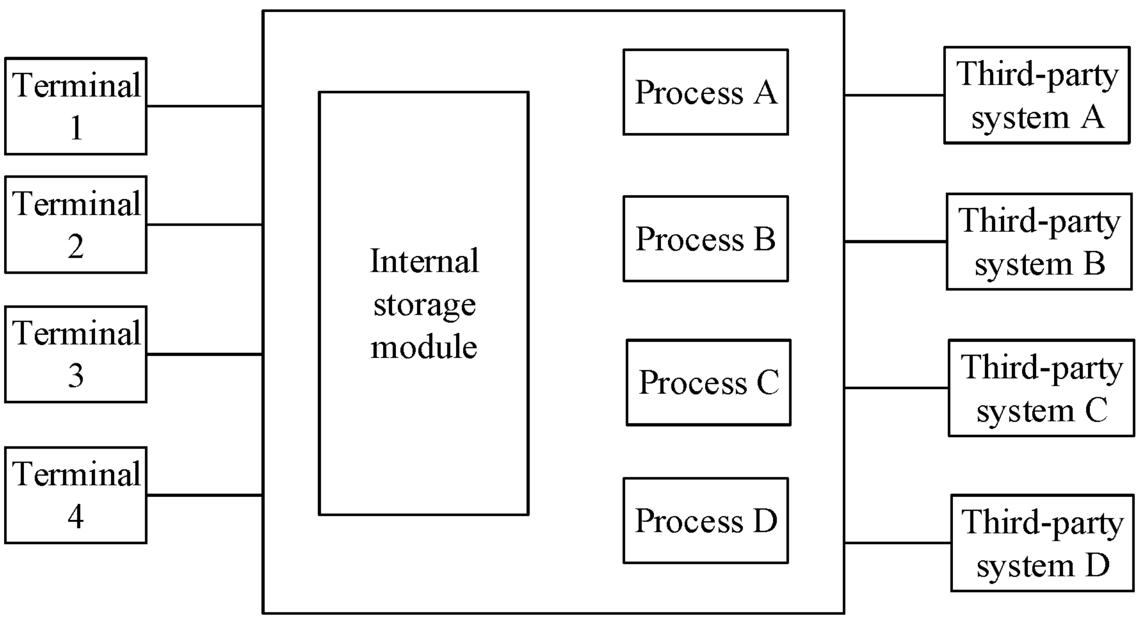
FIG. 10A is a schematic diagram of an internal implementation structure of a gateway device for multi-system communication protocol conversion provided by an embodiment of the present disclosure.

In some embodiments, as shown in FIG. 10A, a schematic diagram of an internal implementation structure of a gateway device for system communication protocol conversion is provided. The gateway device is configured to establish communication connections between a plurality of terminals and a plurality of third-party systems. Here, the internal storage module in the gateway device stores a set of configuration rules, and each configuration rule in the set of configuration rules is instantiated to obtain a corresponding process of protocol conversion, and each process is in a one-to-one correspondence with the third-party system. For example, a process A corresponds to a third-party system A, a process B corresponds to a third-party system B, a process C corresponds to a third-party system C, and a process D corresponds to a third-party system D. If a new third-party system is added, only a new configuration rule needs to be added to the set of configuration rules, and a new process of protocol conversion is generated, and the gateway device does not need to be restarted.

Figure 11C:
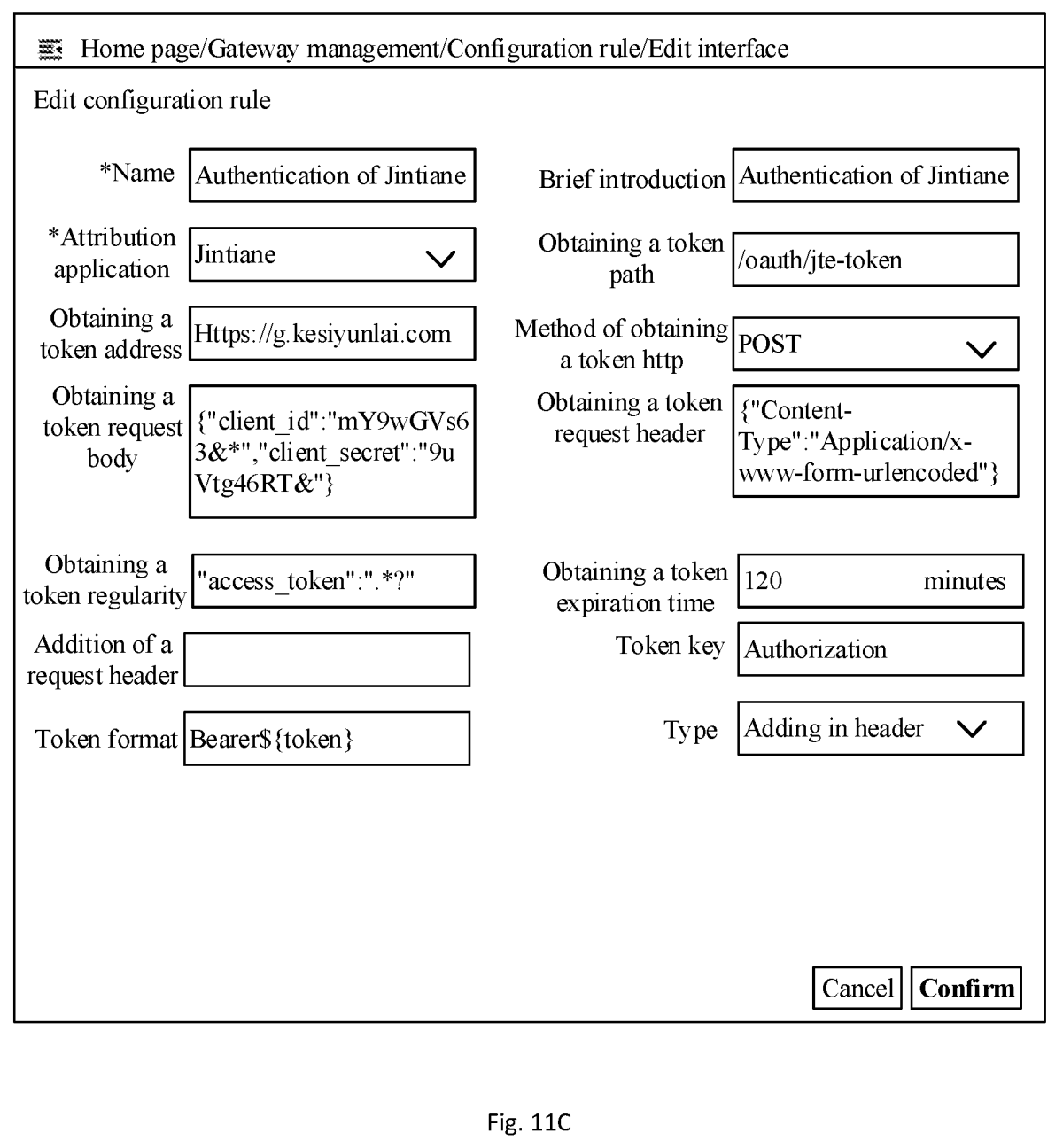

In some embodiments, in order to facilitate better maintenance by the user, at least one instruction of deleting, modifying, and adding configuration rules from the user may also be received through a display interface. As shown in FIG. 11A and FIG. 11B, the user can click keys, such as "delete", "edit" and "and", etc., on the display interface to delete, edit, and add configuration rules on the display interface. The configuration rules may also be modified through the display interface, such as clicking the key of "edit" to display a token editing interface, as shown in FIG. 11C, the followings may be modified: obtaining a token address (an address for obtaining a token), a method for obtaining token http (an http method for obtaining a token), obtaining a token request body (addition or modification of obtaining a token request body), obtaining a token request header (addition or modification of obtaining a token request header), obtaining a token regularity (obtaining a regular expression of a token), an expiration time of a token (a token expiration time), a key of a token (a token key), a format of a token (a token format), a type (selecting to add after url or in a request header), etc.

In some embodiments, at least one instruction of a user performing a touch operation or a voice control operation on configuration rules on a display interface is received, and the execution of the operation corresponding to the instruction is triggered on the configuration rule; or, at least one instruction of a user performing a touch operation or a voice control operation on configuration rules in a pop-up window of a display interface is received, and the execution of the operation corresponding to the instruction is triggered on the configuration rule.

In some embodiments, after receiving at least one instruction from the user for deleting, modifying, or adding a configuration rule through the display interface, the set of configuration rules may also be updated in any of the following modes.

Mode 1) receiving a database synchronization instruction triggered by the user through the display interface, and updating the set of configuration rules.

Mode 2) Updating the set of configuration rules at a preset period.

At least two updating modes are provided in the embodiments, one is to update the set of configuration rules after receiving an instruction from a user, and the other is to update the set of configuration rules at regular intervals. The database synchronization instruction triggered by the user via the display interface may be an instruction triggered by the user after editing and saving, an instruction triggered by clicking a key, or an instruction triggered by clicking a confirmation key after deleting configuration rules, which is not limited in the embodiments. For example, "database synchronization time" may be set on the display interface, so as to automatically update the database according to the preset database synchronization time, so as to update the gateway system in time, maintain communications between the terminal and the third-party system, and avoid the problem of communication interruption caused by emergencies such as downtime, etc. The method of updating the set of configuration rules according to the preset period in the embodiments can make the update of the set of configuration rules mechanize, and reduce labor costs; and the update period can be adjusted and the target adjustment can be made according to external conditions, so as to meet user's requirements. For example, effective and appropriate adjustments can be made for high-concurrency situations (such as Double Eleven and other situations where there are large-scale external communication requests).

In some embodiments, any of the following methods for updating configuration rules is provided.

Method 1) if the change of the configuration rules in the set of configuration rules is monitored by the monitoring process, then the update process is notified to update the set of configuration rules.

Figure 10B:
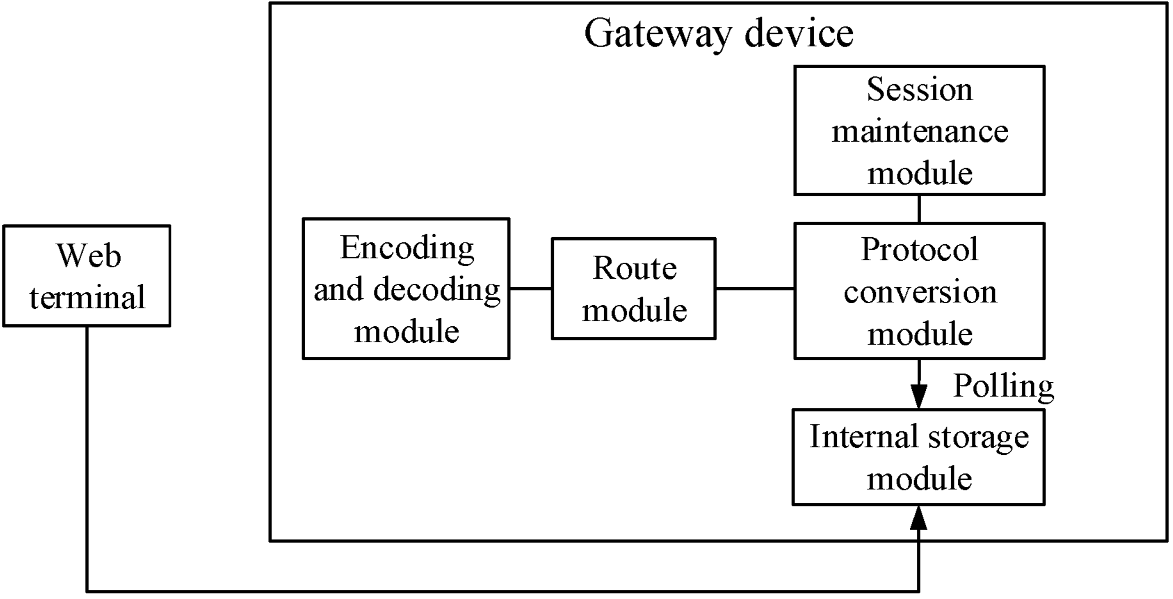
FIG. 10B is a schematic diagram of a first configuration rule update provided by an embodiment of the present disclosure.

The update process of this method is shown in FIG. 10B. After modifying the set of configuration rules through the web terminal, the protocol conversion module monitors the change of the configuration rules in the set of configuration rules stored in the internal storage module of the gateway device through polling, and updates the set of configuration rules.

Method 2) the set of configuration rules is stored in a message queue and the content of the message queue is monitored; and if the change of the configuration rules in the set of configuration rules is monitored, the content of the message queue is updated accordingly.

Figure 10C:
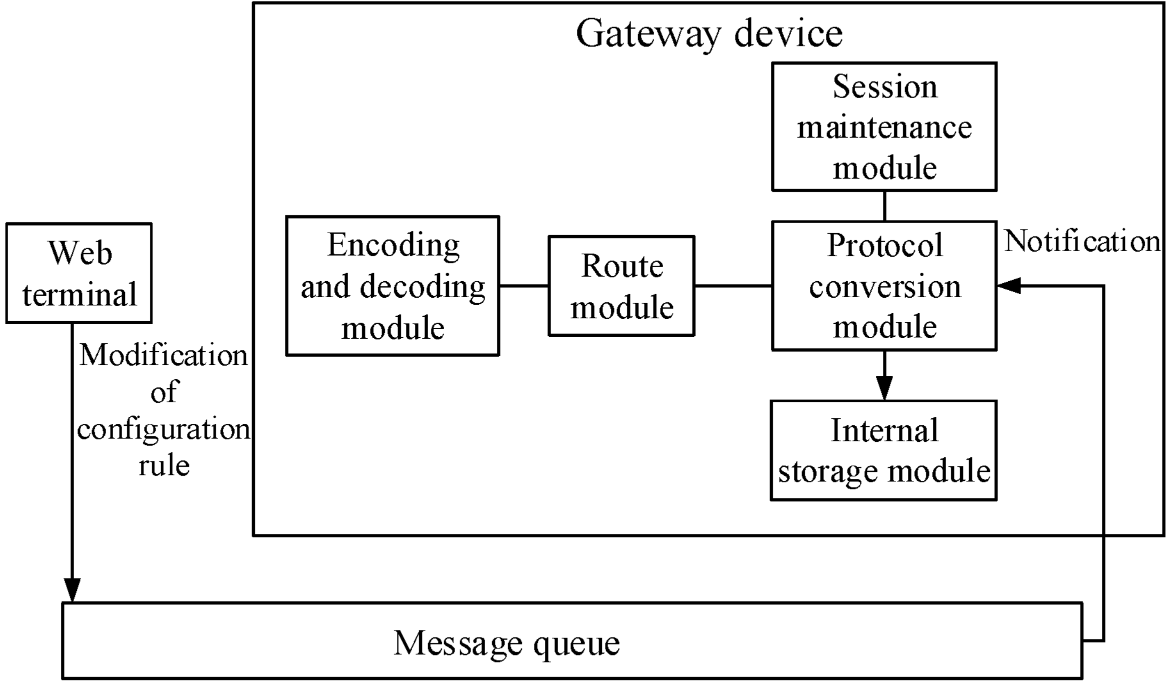
FIG. 10C is a schematic diagram of a second configuration rule update provided by an embodiment of the present disclosure.

The update process of this method is shown in FIG. 10C. After modifying the set of configuration rules through the Web terminal, the change of the configuration rules in the set of configuration rules stored in the message queue is monitored, the configuration rules in the message queue are updated accordingly, and the protocol conversion module is notified to update the configuration rules stored in the internal storage module.

In the embodiments, the above methods 1)-2) and methods 1)-2) can be implemented in combination, which is not limited herein. It should be noted that the above update method can dynamically realize human-computer interaction, which is more conducive to fast, efficient and interface-friendly monitoring. For the system, there is no need for downtime, thus maintaining the efficient operation of the system; for the executor, there is no need for in-depth configuration knowledge and no need to go to the background to execute complex codes, thus improving the user's experience.

When multiple executors (platform users, as shown in FIG. 10A, there are multiple web terminals) use the platform to configure, the operation of a certain executor can provide updated content to other executors through the web terminal in the manner shown in FIG. 10B or FIG. 10C (including but not limited to: operator ID and other identity information, operation update time of the operator, and a human-computer interaction window for remarks which serves as a log), so that other users can quickly know what configuration the current common system has undergone update, so as to make decisions. Especially at high-concurrency time nodes, the solution of this platform can quickly update information exchange and improve the user's experience, so as to effectively deal with emergencies.

In some embodiments, a method for updating configuration rules is further provided, which specifically includes any one or more of the followings.

1) When it is determined that there is a new configuration rule, updating the set of configuration rules according to the new configuration rule.

During the implementations, the new configuration rule is added to the set of configuration rules, wherein the new configuration rule is in a one-to-one correspondence with the third-party system.

2) When it is determined to delete a configuration rule in the set of configuration rules, then updating the set of configuration rules according to the deleted configuration rule.

During the implementations, the configuration rules that need to be deleted in the set of configuration rules are deleted.

3) When it is determined to modify a configuration rule in the set of configuration rules, updating the set of configuration rules according to the modified configuration rule.

During the implementations, the modified configuration rules are in a one-to-one correspondence with the third-party systems.

In the process of modifying, deleting or adding configuration rules in the embodiments, since the gateway does not need to be restarted, it can ensure that the communication connections with multiple third-party systems are not interrupted, which solves the problems of low efficiency caused by traditional, customized and developed adapter services, and an interval period caused by online environment restart services, and integrates with the gateway, to thereby effectively save server resources.

In some embodiments, in order to realize the session persistence function, the following manner for periodically sending a connection request is specifically as follows:

determining access token information in the configuration rule corresponding to the network request message; and periodically sending a connection request message for maintaining a session connection to the third-party system according to the access token information.

After periodically sending a connection request message for maintaining a session connection to the third-party system, an access token sent by the third-party system is received, a probing interface (KeepAlive interface) of the third-party system is accessed according to a preset period, and the validity of the access token is determined. Here, the probing interface is provided by a third-party system, and the token (access token) serving as a parameter in the probing interface is invoked. The method for determining the validity of the access token provided in the embodiments can improve the user's experience, intuitively and quickly display the result of the validity of the access token to the user, and facilitate the user to quickly respond to the situation when the token becomes invalid.

In some embodiments, after determining the validity of the access token, if the access token is invalid, the user is prompted through a display interface that the access token of the third-party system is invalid, and the way of prompting the user includes but is not limited to at least one of alert information or prompt information. In the embodiments, the validity of the access token can also be determined periodically, and if it is determined that the access token is invalid, the user can also be prompted through the display interface, so as to improve the efficiency of user operation and maintenance.

Figure 12:
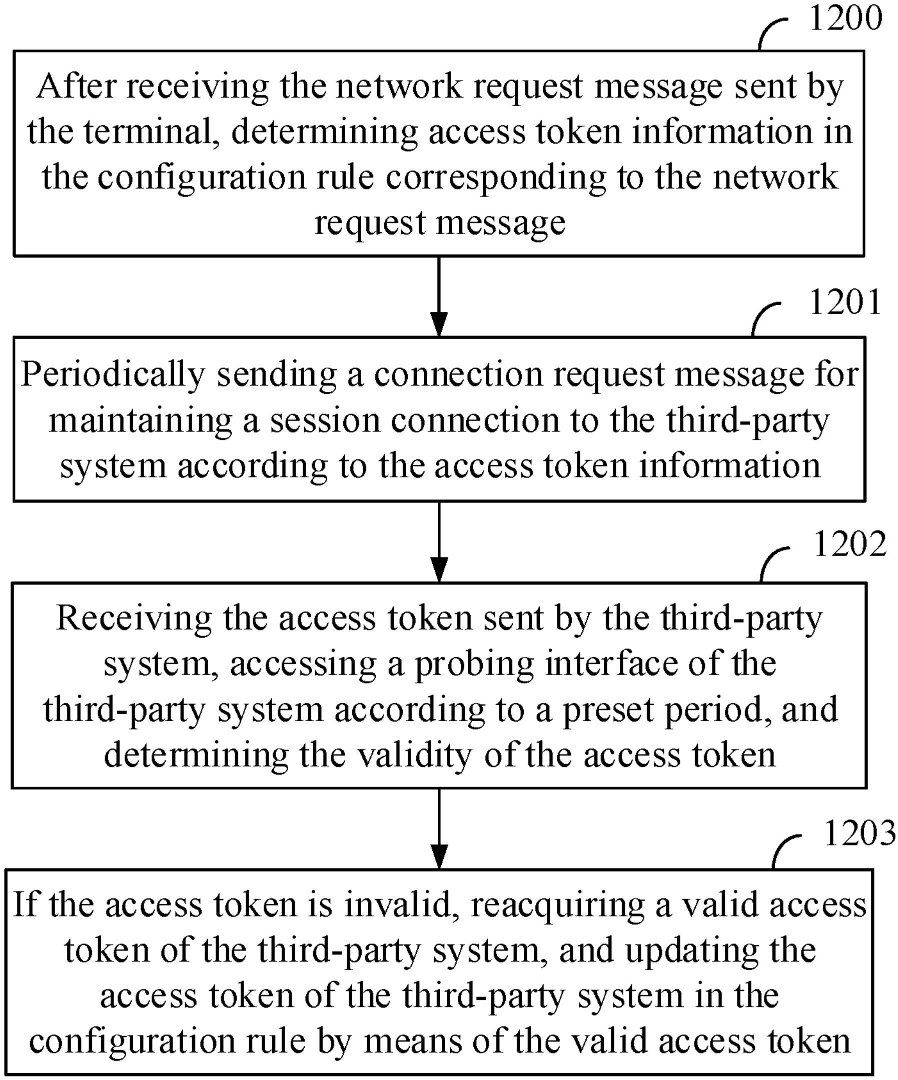
FIG. 12 is an implementation flow chart for implementing a session hold function provided by an embodiment of the present disclosure.

A function of maintaining a connection with a third-party system and determining the validity of the access token is provided in the embodiments, as shown in FIG. 12, and the specific implementation method is as follows.

S1200, after receiving the network request message sent by the terminal, determining access token information in the configuration rule corresponding to the network request message.

In the embodiments, the access token information includes but is not limited to at least one of a request address of the access token or a request parameter of the access token.

S1201, periodically sending a connection request message for maintaining a session connection to the third-party system according to the access token information.

It is easy to understand that the connection request message is used to obtain the access token of the third-party system.

S1202, receiving the access token sent by the third-party system, accessing a probing interface (KeepAlive interface) of the third-party system according to a preset period, and determining the validity of the access token.

Optionally, after receiving the access token sent by the third-party system, the access token is stored, such as storing the access token sent by a configuration system in a cache database cluster redis. In some embodiments, information such as sessions and cookies of the third-party system may also be stored, and the information is updated before invalidation, so as to maintain a session connection with the third-party system.

S1203, if the access token is invalid, reacquiring a valid access token of the third-party system, and updating the access token of the third-party system in the configuration rule by means of the valid access token.

In some embodiments, a valid access token is reacquired by: according to access token information in the configuration rule corresponding to the network request message, resending a connection request message for maintaining a session connection to the third-party system; and receiving the valid access token sent by the third-party system.

In some embodiments, as shown in FIG. 13A, a first comparison diagram before and after protocol conversion is provided. The two items of systemtype and token are not added to Request Header before protocol conversion. The configuration rule is to add systemtype and token required by the third-party system in Request Header. During the implementations, the gateway device determines the corresponding configuration rule according to the route information 1624415503178, and adds the following information to Request Header of the original request message:

"systemtype:1
token:0a05b60c-476d-43c4-b1bb-e671e7435118".

The added request message is forwarded to the third-party system, that is, to the third-party system with Request Url of 10.251.186.44:8070.

In some embodiments, as shown in FIG. 13B, a second comparison diagram before and after protocol conversion is provided. The sdk file provided by the third-party system is used to encrypt data. The gateway device determines the corresponding configuration rule according to the route information 1624415503178, obtains the sdk from the configuration rule, invokes the sdk to encrypt the data of the request body, and forwards it to the third-party system, that is, to 10.251.186.44:8070.

In some embodiments, a specific conversion content of communication protocol conversion is provided as follows:

```
{
“id”: 1,# representing an identification of a configuration rule
“name”: “a name of a configuration rule”
# obtaining an address of a token
“getTokenUri”: “/oauth/login”,
# obtaining a domain name of a token
“getTokenBaseUrl”: “https://demo.com”,
# a http method for obtaining a token
“getTokenHttpMethod”: “POST”,
# addition or modification of obtaining a token request body
“getTokenRequestBody”: “{“client_id”:“client_id”,“client_secret”:“client_secret”}”,
# addition or modification of obtaining a token request header
“getTokenRequestHeaders”: “{“Content-Type”:“application/x-www-form-urlencoded”}”,
# obtaining a regular expression of a token
“getTokenPattern”: ““access_token”:“(.*?)””,
# an expiration time of a token
“tokenExpire”: 120,
# a key of a token
“tokenKey”: “Authorization”,
# a format of a token
“tokenFormat”: “Bearer ${token}”,
# token validity check uri
“token_expire_check_uri”: “/oauth/checkToken”,
# token invalid string
“token_expire_str”: “Invalid Access Token”,
# selecting to add after url or in a request header
“addTokenType”: 2,
# digital signature algorithm
“sign”: “com.boe.cloud.sign.Sign”,
# digital signature range, selecting a body or body&headers
“signRange”: “body”,
# a key of digital signature
“signKey”: “Sign”,
# data encryption algorithm
“sign”: “com.boe.cloud. encrypt. Encrypt”,
# addition or modification of a request header
“addRequestHeaders”: “{“Content-Type”:“application/json”}”,
# removal of a request header
“removeRequestHeaders”: “{“Content-Type”}”,
# addition or modification of a request body
“addRequestBody”: “{“Body1”:“body”}”,
# addition or modification of a request parameter
“addRequestParam”: “{“id”:“1”}”,
# addition of a session
“addSession”: “jsessionid”,
# removal of a session
“false”,
# addition or modification of a response header
“addResponseHeaders”: “{“source”:“Third Sys”}”,
# removal of a response header
“removeResponseHeaders”: “{[“Token”]}”,
# addition or modification of a response body
“addResponseBody”: “{“body”:“body”}”,
# removal of a response body
“removeResponseBody”: “”,
# an address of redirection
“redirect”: “www.XXX.com”,
# forward address
“forward”: “/forward/uri”,
# modification of response codes
“statusCode”: “200”,
# optimistic locking, used to determine a version of a current adaptation policy
“version”: 1
}.
```

The communication protocol conversion method provided in the embodiments can be applied to a gateway device, thereby reducing the number of servers and deployment workload, and improving the utilization rate of the gateway devices. Based on the set of configuration rules, the communication connection to different third-party systems is realized. if there a new third-party system, configuration rules of the new third-party system need to be added to the set of configuration rules, and there is no need to restart the gateway device, thereby improving development efficiency, reducing the difficulty of operation and maintenance, and solving the problem of service paralysis during restarting the gateway device. Further, the communication protocol conversion method improved in the embodiments can also perform digital signature and encryption on a request message from the terminal by supporting the import of external sdk files, thus solving the current problem of only introducing external sdk files through codes in advance, and effectively improving development efficiency, especially for the construction of a large number of third-party systems.

In some embodiments, as shown in FIG. 14, a communication protocol conversion system is provided for establishing communication connections between a communication device and a plurality of third-party systems. The system includes at least one communication device 1400, a gateway device 1401 and a plurality of third-party systems 1402.

The communication device 1400 is configured to send a network request message for establishing a communication connection with the third-party system 1402.

The gateway device 1401 is configured to receive the network request message, determine a configuration rule corresponding to the network request message from the set of configuration rules, perform communication protocol conversion on the network request message according to the configuration rule, and send the network request message after the communication protocol conversion to the corresponding third-party system 1402. The set of configuration rules includes configuration rules of communication protocols of different third-party systems.

Figure 15:
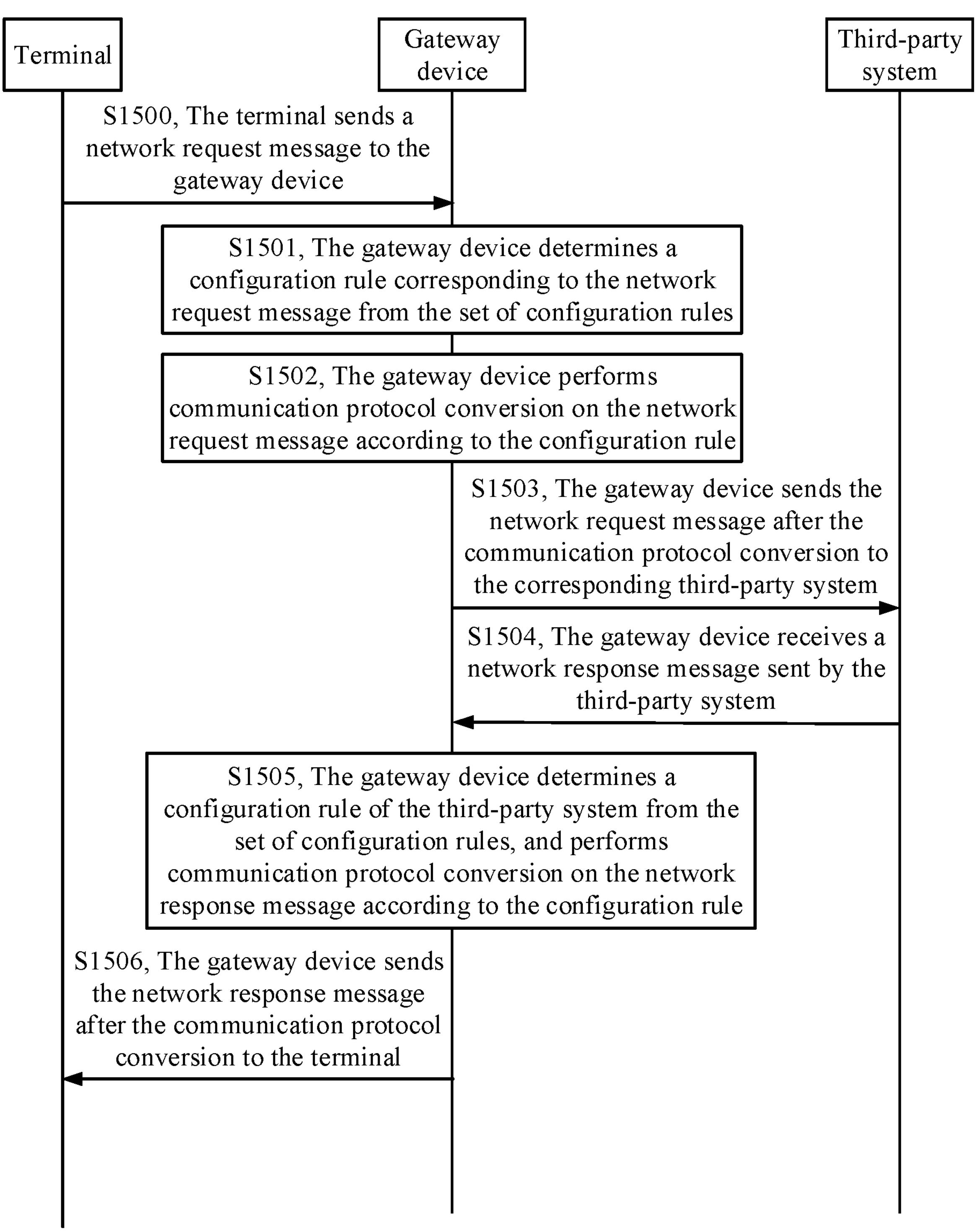
FIG. 15 is a schematic diagram of an interaction process of communication protocol conversion provided by an embodiment of the present disclosure.

As shown in FIG. 15, taking a terminal and a third-party system as an example, an interaction process of the communication protocol conversion in the embodiments of the present disclosure is as follows.

S1500, the terminal sends a network request message to the gateway device.

S1501, the gateway device determines a configuration rule corresponding to the network request message from the set of configuration rules.

Here, the set of configuration rules includes configuration rules of communication protocols of different third-party systems.

In implementations, the gateway device determines the third-party system corresponding to route information according to the route information carried in the network request message, and determines the configuration rule corresponding to the third-party system from the set of configuration rules.

S1502, the gateway device performs communication protocol conversion on the network request message according to the configuration rule.

In some embodiments, the gateway device instantiates the protocol conversion rules in the configuration rule to obtain a process of protocol conversion; the network request message undergoes communication protocol conversion through the process of protocol conversion.

S1503, the gateway device sends the network request message after the communication protocol conversion to the corresponding third-party system.

In some embodiments, the gateway device sends the network request message after the communication protocol conversion to the third-party system corresponding to route information according to the route information carried in the network request message.

S1504, the gateway device receives a network response message sent by the third-party system.

S1505, the gateway device determines a configuration rule of the third-party system from the set of configuration rules, and performs communication protocol conversion on the network response message according to the configuration rule.

In some embodiments, the gateway device instantiates the protocol conversion rules in the configuration rule to obtain a process of protocol conversion; and performs the communication protocol conversion on the network response message through the process of protocol conversion.

In some embodiments, if the configuration rule includes a software development kit file of a third-party system, a class loader is used to load the software development kit file of the third-party system to obtain a process of executing the software development kit file, the network request message is digitally signed and encrypted by the process of executing the sdk file. The software development kit file is in a one-to-one correspondence with the third-party system.

S1506, the gateway device sends the network response message after the communication protocol conversion to the terminal.

In some embodiments, the gateway device sends the network response message after the communication protocol conversion to the terminal located at a source address according to the source address of the network request message.

In some embodiments, after receiving the network request message sent by the terminal for establishing a communication connection with the third-party system, the gateway device determines access token information in the configuration rule corresponding to the network request message; and periodically sends a connection request message for maintaining a session connection to the third-party system according to the access token information.

In some embodiments, after periodically sending the connection request message for maintaining a session connection to the third-party system, the gateway device receives an access token sent by the third-party system, accesses a probing interface of the third-party system according to a preset period, and determines the validity of the access token.

In some embodiments, if it is determined that the access token is invalid, the gateway device prompts the user through a display interface that the access token of the third-party system is invalid.

In some embodiments, after determining the validity of the access token, the gateway device updates the access token. Specifically, if the access token is invalid, a valid access token of the third-party system is reacquired, and the valid access token is used to update the access token of the third-party system in the configuration rule.

In some embodiments, the gateway device resends a connection request message for maintaining a session connection to the third-party system according to access token information in the configuration rule corresponding to the network request message, and receives a valid access token sent by the third-party system.

In some embodiments, the gateway device is further configured to use a class loader to load a software development kit (sdk) file of the third-party system, store the loaded sdk file into the set of configuration rules. The sdk file is in a one-to-one correspondence with the third-party system.

In some embodiments, if the configuration rule includes an sdk file, the gateway device uses the sdk file to digitally sign and encrypt the network request message.

In some embodiments, the gateway device may also receive at least one instruction for deleting, modifying, or adding configuration rules from the user through a display interface.

In some embodiments, the gateway device may also receive a database synchronization instruction triggered by the user through the display interface, and update the set of configuration rules; or, update the set of configuration rules according to a preset period.

In some embodiments, the gateway device may also update the set of configuration rules in the following manner: if the change of a configuration rule in the set of configuration rules is monitored through a monitoring process, notifying an update process to update the set of configuration rules; or, storing the set of configuration rules in a message queue and monitoring the content of the message queue, and updating the content of the message queue if the change of a configuration rule in the set of configuration rules is monitored.

In some embodiments, the gateway device may also update the set of configuration rules, including: if it is determined that there is a new configuration rule, then updating the set of configuration rules according to the new configuration rule; or, if it is determined to delete a configuration rule in the set of configuration rules, updating the set of configuration rules according to the deleted configuration rule; or, if it is determined to modify a configuration rule in the set of configuration rules, updating the set of configuration rules according to the modified configuration rule.

In some embodiments, the configuration rules include at least one of a routing rule, an encoding and decoding rule, or a protocol conversion rule.

The protocol conversion rules include at least one of a token configuration rule, a digital signature configuration rule, a message configuration rule, or a configuration rule using a software development kit file.

Figure 16:
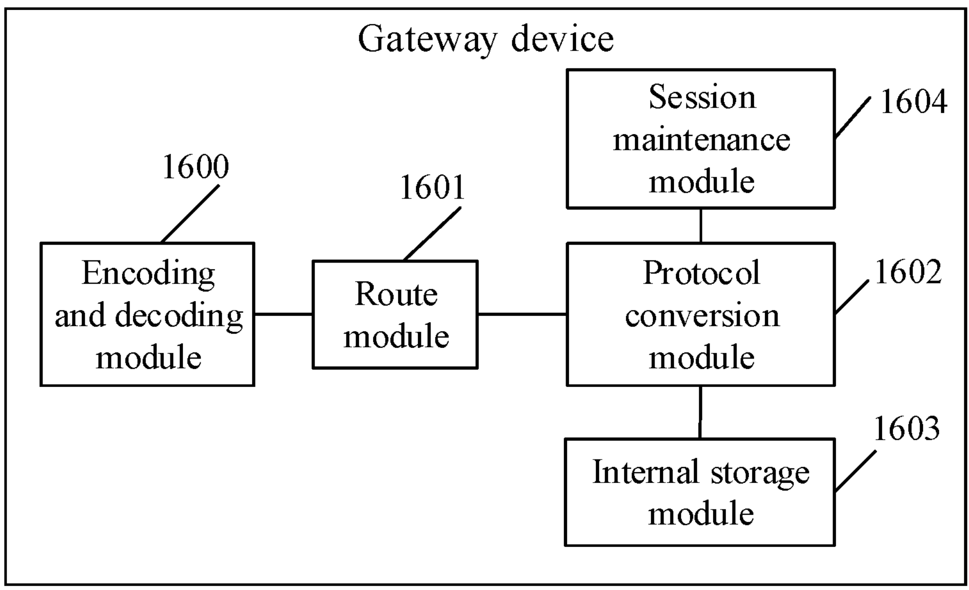
FIG. 16 is a schematic diagram of a specific internal structure of a gateway device provided by an embodiment of the present disclosure.

As shown in FIG. 16, a specific internal structure diagram of a gateway device is provided in the embodiments, including an encoding and decoding module 1600, a route module 1601, a protocol conversion module 1602, an internal storage module 1603, and a session maintenance module 1604.

The encoding and decoding module 1600 is configured for decoding all received network request messages and encoding sent network request messages. Here, the principles of encoding and decoding processing of the network response message and the network request message are the same.

In the implementations, the encoding and decoding processing logic of the encoding and decoding module may be the same as the general encoding and decoding principle. The message may further be encoded and decoded according to an encoding and decoding algorithm required by the third-party system. That is, after receiving a request message from a terminal, the gateway device first decodes the request message generally to obtain route information, decodes the request message again according to an encoding and decoding rule required by the third-party system in the configuration rule corresponding to the route information, and performs the corresponding protocol conversion; and then the gateway device first encodes the request message according to the encoding and decoding rule required by the third-party system, and then encodes the request message again according to the general encoding and decoding principle, and forwards the encoded request message to the third-party system.

The route module 1601 is configured for forwarding different network request messages according to corresponding configuration rules. Here, the forwarding principles of the network response message and the network request message are the same.

The protocol conversion module 1602 is configured for convert the received network request message into a network request message meeting the requirements of the third-party system according to the corresponding configuration rules. Here, the principles of protocol conversion modes of the network response message and the network request message are the same.

In some embodiments, the protocol conversion module is configured for receiving at least one network request message sent by the communication device, where the network request message represents a message for establishing a communication connection with a third-party system; determining a configuration rule corresponding to the network request message from the set of configuration rules, where the set of configuration rules includes configuration rules of communication protocols of different third-party systems; performing communication protocol conversion on the network request message according to the configuration rule; and sending the network request message after the communication protocol conversion to the corresponding third-party system.

The internal storage module 1603 is configured for storing configuration rules, sdk files of third-party systems and other data.

The session maintenance module 1604 is configured for maintaining a session with the third-party system, storing a token, a session, a cookies and other information of the third-party system, and updating the information before the information becomes invalid.

Figure 17:
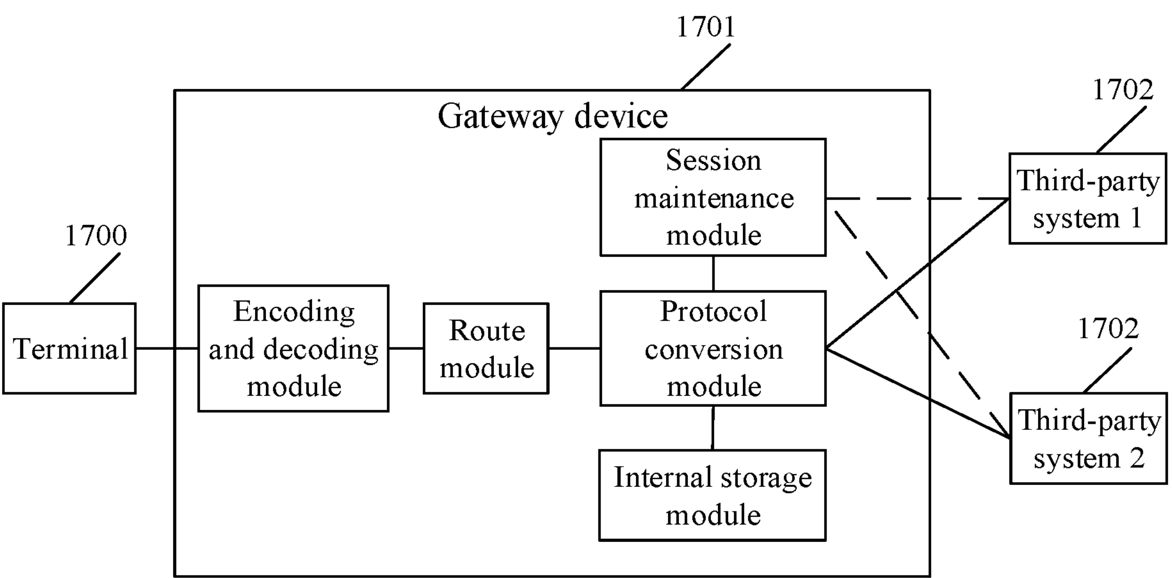
FIG. 17 is a schematic diagram of a communication protocol conversion system provided by an embodiment of the present disclosure.

As shown in FIG. 17, a communication protocol conversion system is provided in the embodiments, including a terminal 1700, a gateway device 1701, and a third-party system 1702. Here, a network request message sent by the terminal 1700 is first encoded and decoded by the encoding and decoding module in the gateway device 1701 to obtain route information. The route information passes through the route module and the corresponding configuration rules from the internal storage module are determined. The conversion module performs protocol conversion on the network request message based on the configuration rules, and during the entire protocol conversion process, the session connections between the gateway device and multiple third-party systems are always maintained through the session maintenance module.

In the embodiments, a communication connection between each terminal and a third-party system in the communication protocol conversion system needs to undergo communication protocol conversion via the gateway device. The core of the communication protocol conversion is to configuration rules of different third-party systems included in the set of configuration rules to perform the protocol conversions, thus achieving universality. Since only the set of configuration rules is needed to perform protocol conversion, even if there are configuration rules of adding, modifying or deleting, only the set of configuration rules needs to be updated without restarting the gateway device to avoid the outage of respective third-party systems. In addition, uploading a customized sdk file can also be supported, which can solve the scenario where a third-party system does not disclose data encryption or digital signature algorithms. Due to small size, the method in the embodiments of the present disclosure can be deployed on gateway devices, which saves hardware resources, and will not affect the performance of the gateway devices.

Based on the same inventive concept, an embodiment of the present disclosure also provides a gateway device. Since the device is the device in the method in the embodiments of the present disclosure, and the problem-solution principle of the device is similar to the method. The device's implementations refer to the implementations of the method, which will not be repeated herein.

Figure 18:
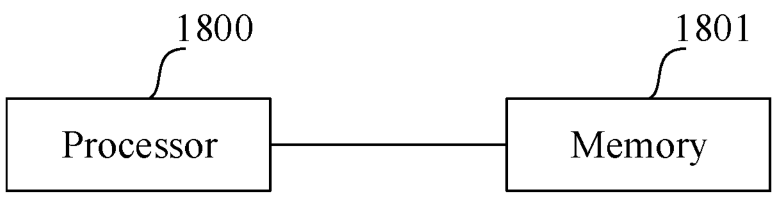
FIG. 18 is a schematic diagram of a gateway device provided by an embodiment of the present disclosure.

As shown in FIG. 18, the device includes a processor 1800 and a memory 1801. The memory 1801 is configured to store executable programs of the processor 1800. The processor 1800 is configured to read the programs in the memory 1801 to execute the following operations: receiving at least one network request message for establishing a communication connection with a third-party system sent by a communication device;

determining a configuration rule corresponding to the network request message from a set of configuration rules, where the set of configuration rules includes configuration rules of communication protocols of different third-party systems; performing communication protocol conversion on the network request message according to the configuration rule; and sending the network request message after the communication protocol conversion to the corresponding third-party system.

As an optional embodiment, the processor is further configured to execute: receiving at least one network request message for establishing a communication connection with a non-third-party system sent by the communication device; and directly sending the network request message to the non-third-party system.

As an optional embodiment, the processor is further configured to execute: receiving a network request message from the communication device, determining that the network request message is a network request message for establishing a communication connection with a third-party system, or determining that the network request message is a network request message for establishing a communication connection with a non-third-party system.

As an optional embodiment, the processor is configured to execute: determining a configuration rule corresponding to route information from the set of configuration rules according to the route information carried in the network request message.

As an optional embodiment, the configuration rule is in a one-to-one correspondence with the route information; or, the multiple pieces of route information correspond to the same configuration rule.

As an optional embodiment, the processor is configured to execute: determining a third-party system corresponding to the route information according to the route information carried in the network request message; and determining a configuration rule corresponding to the third-party system from the set of configuration rules.

As an optional embodiment, the processor is configured to execute: obtaining a process of protocol conversion by instantiating protocol conversion rules in the configuration rule; and performing communication protocol conversion on the network request message through the process of protocol conversion.

As an optional embodiment, the processor is configured to execute: in a case that the configuration rule includes a software development kit file of the third-party system, loading the software development kit file of the third-party system via a class loader to obtain a process of executing the software development kit file, where the software development kit file is in a one-to-one correspondence with the third-party system.

As an optional embodiment, the processor is configured to execute: performing digital signature and encryption on the network request message by the process of executing the software development file.

As an optional embodiment, the processor is further configured to execute: loading the software development kit (sdk) file of the third-party system via a class loader; and storing the loaded sdk file in the set of configuration rules, where the sdk file is in a one-to-one correspondence with the third-party system.

As an optional embodiment, the processor is configured to execute: if the configuration rule includes the sdk file, performing digital signature and encryption on the network request message by means of the sdk file.

As an optional embodiment, the processor is configured to execute: sending the network request message after the communication protocol conversion a third-party system corresponding to route information according to the route information carried in the network request message.

As an optional embodiment, after sending the network request message after the communication protocol conversion to the corresponding third-party system, the processor is further configured to execute: receiving a network response message from the third-party system, and determining the configuration rule of the third-party system from the set of configuration rules; performing communication protocol conversion on the network response message according to the configuration rules; and sending the network response message after the communication protocol conversion to the communication device.

As an optional embodiment, the processor is configured to execute: obtaining a process of protocol conversion by instantiating protocol conversion rules in the configuration rule; and performing communication protocol conversion on the network response message via the process of protocol conversion.

As an optional embodiment, the processor is configured to execute: sending the network response message after the communication protocol conversion to the communication device at a source address according to the source address in the network request message.

As an optional embodiment, after receiving the network request message for establishing a communication connection with the third-party system sent by the communication device, the processor is further configured to execute: determining access token information in the configuration rule corresponding to the network request message; and periodically sending a connection request message for maintaining a session connection to the third-party system according to the access token information.

As an optional embodiment, after periodically sending the connection request message for maintaining a session connection to the third-party system, the processor is further configured to execute: receiving the access token from the third-party system, accessing a probing interface of the third-party system according to a preset period, and determining the validity of the access token.

As an optional embodiment, after determining the validity of the access token, the processor is further configured to execute: in a case that the access token is invalid, prompting the user through a display interface that the access token of the third-party system is invalid.

As an optional embodiment, after determining the validity of the access token, the processor is further configured to execute: in a case that the access token is invalid, reacquiring a valid access token of the third-party system, and updating the access token of the third-party system in the configuration rule by using the valid access token.

As an optional embodiment, the processor is configured to execute: resending a connection request message for maintaining a session connection to the third-party system according to the access token information in the configuration rule corresponding to the network request message; and receive a valid access token from the third-party system.

As an optional embodiment, the processor is further configured to execute: receiving at least one instruction of deleting, modifying, or adding a configuration rule from the user through the display interface.

As an optional embodiment, the processor is further configured to execute: receiving at least one instruction of the user performing a touch operation or a voice control operation on the configuration rule on the display interface, and triggering the execution of an operation corresponding to the instruction on the configuration rule; or, receiving at least one instruction of the user performing a touch operation or a voice control operation on the configuration rule in a pop-up window on the display interface, and triggering the execution of an operation corresponding to the instruction on the configuration rule.

As an optional embodiment, after receiving at least one instruction of deleting, modifying, or adding configuration rule from the user through the display interface, the processor is further configured to execute: receiving a database synchronization instruction triggered by the user through the display interface, and updating the set of configuration rules; or, updating the set of configuration rules according to a preset period.

As an optional embodiment, the processor is configured to execute: in a case that a change of the configuration rules in the set of configuration rules is monitored through a monitoring process, notifying an update process to update the set of configuration rules; or, storing the set of configuration rules in a message queue and monitoring content of the message queue, and updating the content of the message queue in a case that a change of configuration rules in the set of configuration rules is monitored.

As an optional embodiment, the processor is configured to execute: in a case that a new configuration rule exists, updating the set of configuration rules according to the new configuration rule; or, in a case that a configuration rule in the set of configuration rules is deleted, updating the set of configuration rules according to the deleted configuration rule; or, in a case that a configuration rule in the set of configuration rules is modified, and updating the set of configuration rules according to the modified configuration rules.

As an optional embodiment, the configuration rules include at least one of a routing rule, an encoding and decoding rule, or a protocol conversion rule.

The protocol conversion rules include at least one of a token configuration rule, a digital signature configuration rule, a message configuration rule, or a configuration rule using a software development kit file.

Based on the same inventive concept, a communication protocol conversion device is further provided in the embodiments of the present disclosure. Since the device is the device in the method in the embodiments of the present disclosure, and the principle of solving the problem of the device is similar to the method, the implementation of the device refers to the implementation of the method, which is not repeated herein.

Figure 19:
FIG. 19 is a schematic diagram of a communication protocol conversion device provided by an embodiment of the present disclosure.

As shown in FIG. 19, the device includes a processor 1900 and a memory 1901. The memory 1901 is configured to store executable programs of the processor 1900. The processor 1900 is configured to read the programs in the memory 1901 to execute the following operations: receiving at least one network request message for establishing a communication connection with a third-party system sent by a communication device; determining a configuration rule corresponding to the network request message from a set of configuration rules, where the set of configuration rules includes configuration rules of communication protocols of different third-party systems; performing communication protocol conversion on the network request message according to the configuration rule; and sending the network request message after the communication protocol conversion to the corresponding third-party system.

As an optional embodiment, the processor is further configured to execute: receiving at least one network request message for establishing a communication connection with a non-third-party system sent by the communication device; and directly sending the network request message to the non-third-party system.

As an optional embodiment, the processor is further configured to execute: receiving a network request message from the communication device, determining that the network request message is a network request message for establishing a communication connection with a third-party system, or determining that the network request message is a network request message for establishing a communication connection with a non-third-party system.

As an optional embodiment, the configuration rule is in a one-to-one correspondence with the route information; or, the multiple pieces of route information correspond to the same configuration rule.

As an optional embodiment, the processor is configured to execute: determining a configuration rule corresponding to the route information from the set of configuration rules according to the route information carried in the network request message.

As an optional embodiment, the processor is configured to execute: determining a third-party system corresponding to route information according to the route information carried in the network request message; and determining a configuration rule corresponding to the third-party system from the set of configuration rules.

As an optional embodiment, the processor is configured to execute: obtaining a process of protocol conversion by instantiating protocol conversion rules in the configuration rule; and performing communication protocol conversion the network request message through the process of protocol conversion.

As an optional embodiment, the processor is configured to execute: in a case that the configuration rule includes a software development kit file of the third-party system, loading the software development kit file of the third-party system via a class loader to obtain a process of executing the software development kit file, where the software development kit file is in a one-to-one correspondence with the third-party system.

As an optional embodiment, the processor is configured to execute: performing digital signature and encryption on the network request message by the process of executing the software development kit file.

As an optional embodiment, the processor is further configured to execute: loading the software development kit (sdk) file of the third-party system via a class loader; and storing the loaded sdk file in the set of configuration rules, where the sdk file is in a one-to-one correspondence with the third-party system.

As an optional embodiment, the processor is configured to execute: in a case that the configuration rule includes an sdk file, performing digital signature and encryption on the network request message by using the sdk file.

As an optional embodiment, the processor is configured to execute: sending the network request message after the communication protocol conversion to a third-party system corresponding to the route information according to the route information carried in the network request message.

As an optional embodiment, after sending the network request message after the communication protocol conversion to the corresponding third-party system, the processor is further configured to execute: receiving a network response message from the third-party system, and determining the configuration rule of the third-party system from the set of configuration rules; performing communication protocol conversion on the network response message according to the configuration rule; and sending the network response message after the communication protocol conversion to the communication device.

As an optional embodiment, the processor is configured to execute: obtaining a process of protocol conversion by instantiating protocol conversion rules in the configuration rule; and performing communication protocol conversion on the network response message via the process of protocol conversion.

As an optional embodiment, the processor is configured to execute: sending the network response message after the communication protocol conversion to the communication device at a source address according to the source address in the network request message.

As an optional embodiment, after receiving the network request message for establishing a communication connection with the third-party system sent by the communication device, the processor is further configured to execute: determining access token information in the configuration rule corresponding to the network request message; and periodically sending a connection request message for maintaining a session connection to the third-party system according to the access token information.

As an optional embodiment, after the periodically sending of the connection request message for maintaining a session connection to the third-party system, the processor is further configured to execute: receiving the access token from the third-party system, accessing a probing interface of the third-party system according to a preset period, and determining the validity of the access token.

As an optional embodiment, after determining the validity of the access token, the processor is further configured to: in a case that the access token is invalid, prompting the user through a display interface that the access token of the third-party system is invalid.

As an optional embodiment, after determining the validity of the access token, the processor is further configured to: in a case that the access token is invalid, reacquiring a valid access token of the third-party system, and updating the access token of the third-party system in the configuration rule by using the valid access token.

As an optional embodiment, the processor is configured to execute: resending a connection request message for maintaining a session connection to the third-party system according to the access token information in the configuration rule corresponding to the network request message; and receiving a valid access token from the third-party system.

As an optional embodiment, the processor is further configured to execute: receiving at least one instruction of deleting, modifying, or adding a configuration rule from the user through the display interface.

As an optional embodiment, the processor is further configured to execute: receiving at least one instruction of the user performing a touch operation or a voice control operation on the configuration rule on the display interface, and triggering the execution of an operation corresponding to the instruction on the configuration rule; or, receiving at least one instruction of the user performing a touch operation or a voice control operation on the configuration rule in a pop-up window on the display interface, and triggering the execution of an operation corresponding to the instruction on the configuration rule.

As an optional embodiment, after receiving at least one instruction of deleting, modifying, or adding a configuration rule from the user through the display interface, the processor is further configured to execute: receiving a database synchronization instruction triggered by the user through the display interface, and updating the set of configuration rules; or, updating the set of configuration rules according to a preset period.

As an optional embodiment, the processor is configured to execute: in a case that a change of configuration rules in the set of configuration rules is monitored through a monitoring process, notifying an update process of updating the set of configuration rules; or, storing the set of configuration rules in a message queue and monitoring the content of the message queue, and updating the content of the message queue in a case that a change of configuration rules in the set of configuration rules is monitored.

As an optional embodiment, the processor is further configured to execute: in a case that a new configuration rule exists, updating the set of configuration rules according to the new configuration rule; or, in a case that a configuration rule in the set of configuration rules is deleted, updating the set of configuration rules according to the deleted configuration rule; or, in a case that a configuration rule in the set of configuration rules is modified, updating the set of configuration rules according to the modified configuration rule.

As an optional embodiment, the configuration rules include at least one of a routing rule, an encoding and decoding rule, or a protocol conversion rule.

The protocol conversion rules include at least one of a token configuration rule, a digital signature configuration rule, a message configuration rule, or a configuration rule using a software development kit file.

Based on the same inventive concept, the embodiments of the present disclosure also provide a communication protocol conversion device. Since the device is the device in the method in the embodiments of the present disclosure, and the problem-solution principle of the device is similar to the method, the implementation of the device refers to the implementation of the method, which is not repeated herein.

Figure 20:
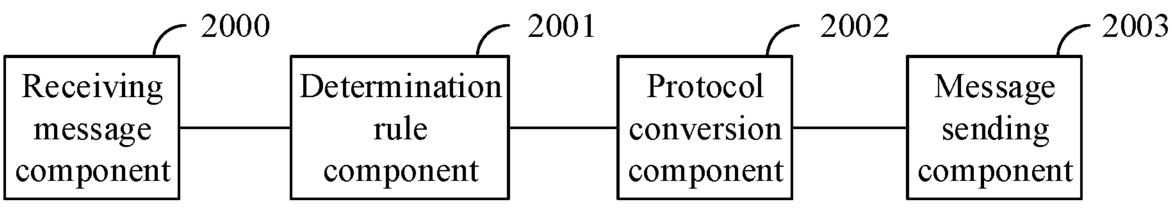
FIG. 20 is a schematic diagram of a communication protocol conversion device provided by an embodiment of the present disclosure.

As shown in FIG. 20, the device includes: a receiving message component 2000, configured to receive at least one network request message for establishing a communication connection with a third-party system sent by the communication device; and a determination rule component 2001, configured to determine a configuration rule corresponding to the network request message from a set of configuration rules, where the set of configuration rules includes configuration rules of communication protocols of different third-party systems; a protocol conversion component 2002, configured to perform communication protocol conversion on the network request message according to the configuration rule; a message sending component 2003, configured to send the network request message after the communication protocol conversion to the corresponding third-party system.

As an optional embodiment, the receiving message component 2000 is further configured for: receiving at least one network request message for establishing a communication connection with a non-third-party system sent by the communication device; and directly sending the network request message to the non-third-party system.

As an optional embodiment, the receiving message component 2000 is further configured for: receiving a network request message from the communication device, determining that the network request message is a network request message for establishing a communication connection with a third-party system, or determining that the network request message is a network request message for establishing a communication connection with a non-third-party system.

As an optional embodiment, the configuration rule is in a one-to-one correspondence with the route information; or, multiple pieces of route information correspond to the same configuration rule.

As an optional embodiment, the determination rule component is specifically configured for: determining the configuration rule corresponding to the route information from the set of configuration rules according to the route information carried in the network request message.

As an optional embodiment, the determination rule component is specifically configured for: determining a third-party system corresponding to the route information according to the route information carried in the network request message; and determining a configuration rule corresponding to the third-party system from the set of configuration rules.

As an optional embodiment, the protocol conversion component is specifically configured for: obtaining a process of protocol conversion by instantiating protocol conversion rules in the configuration rule; and performing communication protocol conversion on the network request message through the process of protocol conversion.

As an optional embodiment, the protocol conversion component is specifically further configured for: in a case that the configuration rule includes a software development kit file of the third-party system, loading the software development kit file of the third-party system via a class loader to obtain a process of executing the software development kit file, where the software development kit file is in a one-to-one correspondence with the third-party system.

As an optional embodiment, the protocol conversion component is specifically further configured for: performing digital signature and encryption on the network request message by the process of executing the software development kit file.

As an optional embodiment, the device further includes a loading component specifically configured for: loading the software development kit (sdk) file of the third-party system via a class loader; and storing the loaded sdk file in the set of configuration rules, where the sdk file is in a one-to-one correspondence with the third-party system.

As an optional embodiment, the protocol conversion component is specifically configured for: in a case that the configuration rule includes an sdk file, performing digital signature and encryption on the network request message by using the sdk file.

As an optional embodiment, the message sending component is specifically configured for: sending the network request message after the communication protocol conversion to a third-party system corresponding to the route information according to the route information carried in the network request message.

As an optional embodiment, after sending the network request message after the communication protocol conversion to the corresponding third-party system, the message sending component is further configured for: receiving a network response message from the third-party system, and determining the configuration rule of the third-party system from the set of configuration rules; performing communication protocol conversion on the network response message according to the configuration rule; and sending the network response message after the communication protocol conversion to the terminal.

As an optional embodiment, the message sending component is specifically further configured for: obtaining a process of protocol conversion by instantiating protocol conversion rules in the configuration rule; and performing communication protocol conversion on the network response message via the process of protocol conversion.

As an optional embodiment, the message sending component is specifically further configured for: sending the network response message after the communication protocol conversion to the communication device at a source address according to the source address in the network request message.

As an optional embodiment, after receiving the network request message for establishing a communication connection with the third-party system sent by the terminal, the device further includes a session connection component further configured for: determining access token information in the configuration rule corresponding to the network request message; and periodically sending a connection request message for maintaining a session connection to the third-party system according to the access token information.

As an optional embodiment, after the periodically sending the connection request message for maintaining a session connection to the third-party system, the session connection component is specifically further configured for: receiving the access token from the third-party system, accessing a probing interface of the third-party system according to a preset period, and determining the validity of the access token.

As an optional embodiment, after the determination of the validity of the access token, the device further includes a display component configured for: in a case that the access token is invalid, prompting the user through a display interface that the access token of the third-party system is invalid.

As an optional embodiment, after determining the validity of the access token, the session connection component is further configured for: in a case that the access token is invalid, reacquiring a valid access token of the third-party system, and updating the access token of the third-party system in the configuration rule by using the valid access token.

As an optional embodiment, the session connection component is specifically configured for: resending a connection request message for maintaining a session connection to the third-party system according to the access token information in the configuration rule corresponding to the network request message; and receiving a valid access token from the third-party system.

As an optional embodiment, the device further includes a receiving instruction component specifically configured for: receiving at least one instruction of deleting, modifying or adding a configuration rule from the user through the display interface.

As an optional embodiment, the receiving instruction component is specifically further configured for: receiving at least one instruction of the user performing a touch operation or a voice control operation on the configuration rule on the display interface, and triggering the execution of an operation corresponding to the instruction on the configuration rule; or, receiving at least one instruction of the user performing a touch operation or a voice control operation on the configuration rule in a pop-up window on the display interface, and triggering the execution of an operation corresponding to the instruction on the configuration rule.

As an optional embodiment, after receiving at least one instruction of deleting, modifying, or adding a configuration rule from the user through the display interface, the device further includes an update component specifically configured for: receiving a database synchronization instruction triggered by the user through the display interface, and updating the set of configuration rules; or, updating the set of configuration rules according to a preset period.

As an optional embodiment, the updating component is specifically configured for: in a case that a change of configuration rules in the set of configuration rules is monitored through a monitoring process, notifying an update process to update the set of configuration rules; or, storing the set of configuration rules in a message queue and monitoring the content of the message queue, and updating the content of the message queue in a case that a change of configuration rules in the set of configuration rules is monitored.

As an optional embodiment, the updating component is specifically configured for: in a case that a new configuration rule exists, updating the set of configuration rules according to the new configuration rule; or, in a case that a configuration rule in the set of configuration rules is deleted, updating the set of configuration rules according to the deleted configuration rule; or, in a case that a configuration rule in the set of configuration rules is modified, updating the set of configuration rules according to the modified configuration rule.

As an optional embodiment, the configuration rules include at least one of a routing rule, an encoding and decoding rule, or a protocol conversion rule.

The protocol conversion rules include at least one of a token configuration rule, a digital signature configuration rule, a message configuration rule, or a configuration rule using a software development kit file.

Based on the same inventive concept, an embodiment of the present disclosure further provides a computer storage medium on which computer programs are stored. The programs are executed by a processor to implement the following operations: receiving at least one network request message sent by the communication device, where the network request message represents a message for establishing a communication connection with a third-party system; determining a configuration rule corresponding to the network request message from a set of configuration rules, wherein the set of configuration rules includes configuration rules of communication protocols of different third-party systems; performing communication protocol conversion on the network request message according to the configuration rule; and sending the network request message after the communication protocol conversion to a corresponding third-party system.

Those skilled in the art should understand that the embodiments of the present disclosure provide methods, systems, or computer program products. Accordingly, the present disclosure can take the form of an entire hardware embodiment, an entire software embodiment, or an embodiment combining software and hardware aspects. Further, the present disclosure may take the form of a computer program product implemented on one or more computer-usable storage medias (including but not limited to disk storage, CD-ROM, optical storage, etc.) having computer-usable program codes embodied therein.

The present disclosure is described with reference to flowcharts and/or block diagrams of methods, apparatus (systems), and computer program products according to embodiments of the present disclosure. It should be understood that each procedure and/or block in the flowcharts and/or block diagrams, and a combination of procedures and/or blocks in the flowcharts and/or block diagrams can be realized by computer program instructions. These computer program instructions may be provided to a general computer, dedicated computer, embedded processor, or a processor of other programmable data processing apparatuses to produce a machine, such that the instructions executed by the processor of the computer or other programmable data processing apparatuses produce an apparatus for realizing the functions specified in one or more procedures of the flowcharts and/or one or more blocks of the block diagrams.

These computer program instructions may also be stored in a computer-readable memory capable of directing a computer or other programmable data processing apparatus to operate in a specific manner, such that the instructions stored in the computer-readable memory produce an article of manufacture including an instruction apparatus. The instruction apparatus realizes the function specified in one or more procedures of the flowcharts and/or one or more blocks of the block diagrams.

These computer program instructions can also be loaded onto a computer or other programmable data processing apparatuses, causing a series of operations to be performed on the computer or other programmable apparatuses to produce a computer-implemented process, so that the instructions executed on the computer or other programmable apparatuses provide steps for implementing the functions specified in one or more procedures of the flowcharts and/or one or more blocks of the block diagrams.

Although preferred embodiments of the present disclosure have been described, additional changes and modifications can be made to these embodiments by those skilled in the art once the basic inventive concept is appreciated. Therefore, it is intended that the appended claims be construed to cover the preferred embodiment and all changes and modifications which fall within the scope of the present disclosure.

Apparently, those skilled in the art can make various changes and modifications to the embodiments of the present disclosure without departing from the spirit and scope of the embodiments of the present disclosure. In this way, if these modifications and variations of the embodiments of the present disclosure fall within the scope of the claims of the present disclosure and their equivalent technologies, the present disclosure also intends to include these modifications and variations.

What is claimed is:

1. A communication protocol conversion method, comprising:

receiving at least one network request message for establishing a communication connection with a third-party system sent by a communication device;

determining a configuration rule corresponding to the network request message from a set of configuration rules, wherein the set of configuration rules comprises configuration rules of communication protocols of different third-party systems;

performing a communication protocol conversion on the network request message according to the configuration rule; and sending the network request message after the communication protocol conversion to a corresponding third-party system;

wherein the determining the configuration rule corresponding to the network request message from the set of configuration rules, comprises:

determining the configuration rule corresponding to route information from the set of configuration rules according to the route information carried in the network request message.

2. The method according to claim 1, further comprising:

receiving at least one network request message for establishing a communication connection with a non-third-party system sent by the communication device; and directly sending the network request message to the non-third-party system.

3. The method according to claim 1, further comprising:

receiving the network request message sent by the communication device; and determining that the network request message is a network request message for establishing a communication connection with a third-party system, or determining that the network request message is a network request message for establishing a communication connection with a non-third-party system.

4. The method according to claim 1, wherein, the configuration rule is in a one-to-one correspondence with the route information; or, multiple pieces of route information correspond to a same one configuration rule.

5. The method according to claim 4, wherein the determining the configuration rule corresponding to the route information from the set of configuration rules according to the route information carried in the network request message, comprises:

determining the third-party system corresponding to the route information according to the route information carried in the network request message; and determining the configuration rule corresponding to the third-party system from the set of configuration rules.

6. The method according to claim 1, wherein the performing a communication protocol conversion on the network request message according to the configuration rule, comprises:

obtaining a process of protocol conversion by instantiating protocol conversion rules in the configuration rule; and performing the communication protocol conversion on the network request message via the process of protocol conversion.

7. The method according to claim 6, wherein the instantiating the protocol conversion rules in the configuration rule, comprises:

in a case that the configuration rule comprises a software development kit file of the third-party system, loading the software development kit file of the third-party system via a class loader to obtain a process of executing the software development kit file, wherein the software development kit file is in a one-to-one correspondence with the third-party system.

8. The method according to claim 7, wherein the performing the communication protocol conversion on the network request message via the process of protocol conversion, comprises:

performing digital signature and encryption on the network request message via the process of executing the software development kit file.

9. The method according to claim 1, wherein the sending the network request message after the communication protocol conversion to the corresponding third-party system, comprises:

sending the network request message after the communication protocol conversion to the third-party system corresponding to route information according to the route information carried in the network request message or wherein after the sending the network request message after the communication protocol conversion to the corresponding third-party system, the method further comprises:

receiving a network response message from the third-party system, and determining a configuration rule of the third-party system from the set of configuration rules;

performing the communication protocol conversion on the network response message according to the configuration rule; and sending the network response message after the communication protocol conversion to the communication device.

10. The method according to claim 9, wherein the performing the communication protocol conversion on the network response message according to the configuration rule, comprises:

obtaining a process of protocol conversion by instantiating protocol conversion rules in the configuration rule; and performing the communication protocol conversion on the network response message via the process of protocol conversion.

11. The method according to claim 1, wherein after receiving the at least one network request message for establishing the communication connection with the third-party system sent by the communication device, the method further includes:

determining access token information in the configuration rule corresponding to the network request message; and periodically sending a connection request message for maintaining a session connection to the third-party system according to the access token information.

12. The method according to claim 11, wherein after the periodically sending the connection request message for maintaining the session connection to the third-party system, the method further comprises:

receiving a access token from the third-party system, accessing a probing interface of the third-party system according to a preset period, and determining the validity of the access token.

13. The method according to claim 12, wherein after the determining the validity of the access token, the method further comprises:

in a case that the access token is invalid, prompting a user through a display interface that the access token of the third-party system is invalid;

in a case that the access token is invalid, reacquiring a valid access token of the third-party system, and updating the access token of the third-party system in the configuration rule by using the valid access token.

14. The method according to claim 13, wherein the reacquiring the valid access token of the third-party system, comprises:

resending a connection request message for maintaining a session connection to the third-party system according to the access token information in the configuration rule corresponding to the network request message; and receiving the valid access token from the third-party system.

15. The method according to claim 1, further comprising:

receiving at least one instruction of deleting, modifying, or adding a configuration rule from a user through a display interface.

16. The method according to claim 15, further comprising:

receiving at least one instruction of the user performing a touch operation or a voice control operation on the configuration rule on the display interface, and triggering the execution of an operation corresponding to the instruction on the configuration rule; or, receiving at least one instruction of the user performing a touch operation or a voice control operation on the configuration rule in a pop-up window on the display interface, and triggering the execution of an operation corresponding to the instruction on the configuration rule.

17. The method according to claim 15, wherein after the receiving at least one instruction of deleting, modifying, or adding the configuration rule from the user through the display interface, the method further comprises:

receiving a database synchronization instruction triggered by the user through the display interface, and updating the set of configuration rules; or, updating the set of configuration rules according to a preset period.

18. The method according to claim 17, wherein the updating the set of configuration rules, comprises:

in a case that a change of a configuration rule in the set of configuration rules is monitored through a monitoring process, notifying an update process to update the set of configuration rules; or, storing the set of configuration rules in a message queue and monitoring content of the message queue, and updating the content of the message queue in a case that a change of a configuration rule in the set of configuration rules is monitored.

19. The method according to claim 16, wherein the updating the set of configuration rules, comprises:

in a case that a new configuration rule exists, updating the set of configuration rules according to the new configuration rule; or, in a case that a configuration rule in the set of configuration rules is deleted, updating the set of configuration rules according to the deleted configuration rule; or, in a case that a configuration rule in the set of configuration rules is modified, updating the set of configuration rules according to the modified configuration rule.

* * * * *